(12) United States Patent  (10) Patent No.: US 7,833,621 B2
Jones et al.  (45) Date of Patent: Nov. 16, 2010

(54) LIGHT MANAGEMENT FILMS WITH ZIRCONIA PARTICLES

(75) Inventors: Clint L. Jones, Somerset, WI (US); Emily S. Goenner, Shoreview, MN (US); David B. Olson, Marine on St. Croix, MN (US); Brant U. Kolb, Afton, MN (US); John T. Cowher, New Richmond, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 3 days.

(21) Appl. No.: 12/250,660

(22) Filed: Oct. 14, 2008

(65) Prior Publication Data

US 2009/0047486 A1  Feb. 19, 2009

Related U.S. Application Data

(60) Division of application No. 11/079,832, filed on Mar. 14, 2005, now abandoned, which is a continuation-in-part of application No. 11/078,468, filed on Mar. 11, 2005, now abandoned.

(51) Int. Cl.
*B32B 5/16* (2006.01)
(52) U.S. Cl. .................................. 428/323
(58) Field of Classification Search ........... 428/323
See application file for complete search history.

(56) References Cited

U.S. PATENT DOCUMENTS

| | | | |
|---|---|---|---|
| 2,984,628 A | 5/1961 | Alexander et al. | |
| 4,568,445 A | 2/1986 | Cates et al. | |
| 4,619,817 A | 10/1986 | Stambaugh et al. | |
| 4,639,356 A * | 1/1987 | O'Toole et al. | 423/266 |
| 4,721,377 A | 1/1988 | Fukuda et al. | |
| 4,784,794 A | 11/1988 | Kato | |
| 4,812,032 A | 3/1989 | Fukuda et al. | |
| 4,845,056 A | 7/1989 | Yamanis | |
| 4,920,014 A * | 4/1990 | Hirai et al. | 428/698 |
| 5,037,579 A | 8/1991 | Matchett | |
| 5,047,174 A | 9/1991 | Sherif | |
| 5,175,030 A | 12/1992 | Lu et al. | |
| 5,183,597 A | 2/1993 | Lu | |
| 5,223,176 A | 6/1993 | Obitsu et al. | |

(Continued)

FOREIGN PATENT DOCUMENTS

EP  0 337 472  10/1989

(Continued)

OTHER PUBLICATIONS

Adschiri et al., "Rapid and Continuous Hydrothermal Crystallization of Metal Oxide Particles in Supercritical Water" J. Am. Ceram. Soc. vol. 75, pp. 1019-1022, 1992.

(Continued)

*Primary Examiner*—Callie E Shosho
*Assistant Examiner*—Elizabeth Robinson
(74) *Attorney, Agent, or Firm*—Carolyn A. Fischer

(57) ABSTRACT

Light management films and methods of making light management films are described. The light management films contain an optical layer that contains polymeric material and zirconia particles. The zirconia particles are colloidal, crystalline, substantially non-associated, and have a narrow size distribution.

26 Claims, 6 Drawing Sheets

U.S. PATENT DOCUMENTS

| | | | |
|---|---|---|---|
| 5,234,870 A | 8/1993 | Osaka et al. | |
| 5,424,339 A | 6/1995 | Zanka et al. | |
| 5,453,262 A | 9/1995 | Dawson et al. | |
| 5,486,949 A | 1/1996 | Schrenk et al. | |
| 5,652,192 A | 7/1997 | Matson et al. | |
| 5,698,483 A | 12/1997 | Ong et al. | |
| 5,783,120 A | 7/1998 | Ouderkirk et al. | |
| 5,825,543 A | 10/1998 | Ouderkirk et al. | |
| 5,828,488 A | 10/1998 | Ouderkirk et al. | |
| 5,882,774 A | 3/1999 | Jonza et al. | |
| 5,908,874 A | 6/1999 | Fong et al. | |
| 5,917,664 A | 6/1999 | O'Neill et al. | |
| 5,919,551 A | 7/1999 | Cobb, Jr. et al. | |
| 5,932,626 A | 8/1999 | Fong et al. | |
| 5,935,275 A | 8/1999 | Burgard et al. | |
| 6,107,364 A | 8/2000 | Fong et al. | |
| 6,111,696 A | 8/2000 | Allen et al. | |
| 6,280,063 B1 | 8/2001 | Fong et al. | |
| 6,329,058 B1 | 12/2001 | Arney et al. | |
| 6,355,754 B1 | 3/2002 | Olson et al. | |
| 6,356,391 B1 | 3/2002 | Gardiner et al. | |
| 6,376,590 B2 * | 4/2002 | Kolb et al. | 524/413 |
| 6,387,981 B1 | 5/2002 | Zhang et al. | |
| 6,541,591 B2 | 4/2003 | Olson et al. | |
| 6,645,569 B2 | 11/2003 | Cramer et al. | |
| 6,663,978 B1 | 12/2003 | Olson et al. | |
| 6,833,391 B1 | 12/2004 | Chisholm et al. | |
| 6,844,950 B2 | 1/2005 | Ja Chisholm et al. | |
| 6,846,089 B2 | 1/2005 | Stevenson et al. | |
| 6,962,946 B2 | 11/2005 | Brady et al. | |
| 6,982,073 B2 | 1/2006 | Sabacky et al. | |
| 6,984,935 B2 | 1/2006 | Chiu et al. | |
| 7,179,513 B2 | 2/2007 | Jones et al. | |
| 7,241,437 B2 | 7/2007 | Davidson et al. | |
| 7,289,202 B2 | 10/2007 | Groess et al. | |
| 7,524,543 B2 | 4/2009 | Jones et al. | |
| 2002/0156162 A1 | 10/2002 | Stadler | |
| 2003/0021566 A1 | 1/2003 | Shustack et al. | |
| 2003/0113254 A1 | 6/2003 | Belov et al. | |
| 2004/0131826 A1 | 7/2004 | Chisholm et al. | |
| 2004/0192790 A1 | 9/2004 | Chiang et al. | |
| 2004/0233526 A1 | 11/2004 | Kaminsky et al. | |
| 2004/0242720 A1 | 12/2004 | Chisholm et al. | |
| 2004/0249100 A1 | 12/2004 | Chisholm et al. | |
| 2005/0049325 A1 | 3/2005 | Chisholm et al. | |
| 2005/0059766 A1 | 3/2005 | Jones et al. | |
| 2005/0063898 A1 * | 3/2005 | Ja Chisholm | 423/608 |
| 2005/0147838 A1 | 7/2005 | Olson et al. | |
| 2005/0148735 A1 | 7/2005 | Olson et al. | |
| 2006/0077322 A1 | 4/2006 | Chuang et al. | |
| 2006/0147702 A1 | 7/2006 | Pokorny et al. | |
| 2006/0148950 A1 * | 7/2006 | Davidson et al. | 524/413 |
| 2006/0204676 A1 | 9/2006 | Jones et al. | |
| 2009/0176061 A1 | 7/2009 | Jones et al. | |

FOREIGN PATENT DOCUMENTS

| | | |
|---|---|---|
| EP | 1 014 113 | 6/2000 |
| EP | 1 510 557 | 3/2005 |
| JP | 60-176920 | 9/1985 |
| JP | 60-251465 | 12/1985 |
| JP | 59-107969 | 7/1991 |
| WO | WO 94/01361 | 1/1994 |
| WO | WO 97/10527 | 3/1997 |
| WO | WO 02/20396 A2 | 3/2002 |
| WO | WO 02/42201 A1 | 5/2002 |
| WO | WO 03/076528 | 9/2003 |
| WO | WO 2004/078652 | 9/2004 |

OTHER PUBLICATIONS

Cabanas et al. "Continuous Hydrothermal Synthesis of Inorganic Materials in a Near-Critical Water Flow Reactor; the one-step synthesis of Nano-Particulate $C_{e1-x}Zr_xO_2$(x=0-1) Solid Solutions" J. Mater. Chem. vol. 11, pp. 561-568, 2001.

Cabanas et al., "A Continuous and Clean One-Step Synthesis of Nano-Particulate $C_{e1-x}Zr_xO_2$ Solid Solutions in Near-Critical Water", Chem. Commun. pp. 901-902, 2000.

Dawson, "Hydrothermal Synthesis of Advanced Ceramic Powders", Ceramic Bulletin, vol. 67, No. 10, pp. 1673-1678, 1988.

Li et al., "X-ray Absorption Studies of Zirconia Polymorphs, I. Characteristic Local Structures" Physical Review B, vol. 48, No. 14, pp. 10 063-10 073, 1993.

Stakkestad et al., "Surface Chemistry of Lanthanum Chromite I. Multivate Data Modeling of Brunauer-Emmett-Teller Surface Area by the use of Particle Size Distribution Data from Photon-Correlation Spectroscopy Measurements", *Colloid Polym. Sci.*, 1999, vol. 277, pp. 174-183.

U.S. Appl. No. 10/870,366, filed Jun. 17, 2004.

* cited by examiner

LIGHT MANAGEMENT FILMS WITH ZIRCONIA PARTICLES

RELATED APPLICATIONS

This application is a divisional of U.S. Ser. No. 11/079,832, filed Mar. 14, 2005 now abandoned which is a continuation-in-part application of U.S. Ser. No. 11/078,468, filed on Mar. 11, 2005, now abandoned, incorporated herein by reference.

TECHNICAL FIELD

This invention relates to light management films and methods of making light management films that contain zirconia particles.

BACKGROUND

Certain microstructured optical products, such as those described U.S. Pat. Nos. 5,175,030 (Lu et al.), 5,183,597 (Lu), 5,917,664 (O'Neill et al), 5,919,551 (Cobb, Jr. et al.), 6,111,696 (Allen et al.), 6,280,063 B1 (Fong et al.), 6,356,39 B1 (Gardiner et al.), can be referred to as structured optical films or light management films. Light management films can include, for example, brightness enhancement films, reflective films, turning films, and the like. These light management films have a variety of uses. For example, brightness enhancement films can be used in electronic products to increase the brightness of a backlit flat panel display such as a liquid crystal display (LCD) included in electroluminescent panels, laptop computer displays, word processors, desktop monitors, hand-held devices, televisions, video cameras, as well as automotive and aviation displays.

The index of refraction of materials in a brightness enhancement film is often related to the brightness gain (i.e., "gain") produced when such a film is used with a backlit display. Improved brightness can allow the electronic product to operate more efficiently by using less power to light the display. The use of lower power often can reduce power consumption, can reduce the heat load on the electronic components, and can extend the lifetime of the electronic product. Brightness enhancement films often contain polymeric material with a high index of refraction (e.g., at least 1.4).

The microstructures included in the light management film can be in a variety of forms such as in a series of alternating tips and grooves. In some examples, the light management films have regular, repeating patterns of symmetrical tips and grooves. In other examples, the light management films have tips and grooves that are non-symmetrical. The size, orientation, or distance between the tips and grooves can be uniform or non-uniform.

One drawback of some current light management films is that the tips of the microstructure are susceptible to mechanical damage. For example, light scraping with a fingernail or a hard, relatively sharp edge can cause the tips of the microstructure to break or fracture. Conditions sufficient to break the tips can occur during normal handling of the light management films. For example, the tips of brightness enhancement films can be broken during the process of manufacturing liquid crystal displays that include such films.

When tips of the microstructure are broken, the reflective and refractive properties of the affected tips are reduced and the transmitted light is scattered in virtually all forward angles. When the light management film is a brightness enhancement film on a display, and the display is viewed straight on, areas that contain scratches in the light management film are less bright then the surrounding, undamaged areas of the brightness enhancement film. However, when the display is viewed at an angle near or greater than the cutoff angle (i.e., the angle at which the image on the display is no longer viewable), the areas that contain scratches look substantially brighter than the surrounding, undamaged area of the film. In both situations, the scratches are objectionable from a cosmetic standpoint. Brightness enhancement films with more than a few, minor scratches may be unacceptable for use in some displays such as liquid crystal displays.

SUMMARY

The present invention provides microstructured articles and methods of making microstructured articles. More particularly, the microstructured articles contain zirconia particles. The zirconia particles are colloidal (e.g., less than 100 nanometers), crystalline, and substantially non-associated. The microstructured articles can be light management films such as, for example, brightness enhancement film, reflective film, turning film, and the like.

In a first aspect, a light management film is provided that includes an optical layer having a microstructured surface. The optical layer contains a polymeric material and a plurality of surface-modified zirconia particles. The zirconia particles contain 0.1 to 8 weight percent yttrium based on a weight of inorganic oxides in the zirconia particles. Further, the zirconia particles have an average primary particle size no greater than 30 nanometers, a dispersion index of 1 to 3, a ratio of intensity-average particle size to volume-average particle size no greater than 3.0, and a crystal structure that is at least 70 percent cubic, tetragonal, or a combination thereof.

Additionally, methods of making light management films are described. A first method includes providing a zirconia sol that contains zirconia particles dispersed in an aqueous phase, modifying the surface of the zirconia particles to form surface-modified zirconia particles, preparing a coating composition that contains the surface-modified zirconia particles and an organic matrix, contacting the coating composition with a micro-replication tool, and polymerizing the coating composition to form an optical layer having a microstructured surface. The zirconia sol is formed by preparing a first feedstock that contains a zirconium salt, subjecting the first feedstock to a first hydrothermal treatment to form a zirconium-containing intermediate and a byproduct, forming a second feedstock by removing at least a portion of the byproduct of the first hydrothermal treatment, and subjecting the second feedstock to a second hydrothermal treatment.

A second method of making a light management film includes providing a zirconia sol that contains zirconia particles dispersed in an aqueous phase, modifying the surface of the zirconia particles to form surface-modified zirconia particles, preparing a coating composition that contains the surface-modified zirconia particles and an organic matrix, contacting the coating composition with a micro-replication tool, and polymerizing the coating composition to form an optical layer having a microstructured surface. The zirconia sol includes a carboxylic acid that contains no greater than four carbon atoms and that is substantially free of a polyether carboxylic acid. The zirconia particles have an average primary particle size no greater than 50 nanometers, a dispersion index of 1 to 5, a ratio of intensity-average particle size to volume-average particle size no greater than 3.0, and a crystal structure that is at least 50 percent cubic, tetragonal, or a combination thereof. In some embodiments of the zirconia sol, the zirconia particles contain 0.1 to 8 weight percent yttrium based on the weight of the inorganic oxides in the zirconia particles and have a crystal structure that is at least 70 percent cubic, tetragonal, or a combination thereof.

As used herein, the terms "a", "an", and "the" are used interchangeably with "at least one" to mean one or more of the elements being described.

As used herein, the term "associated" refers to a grouping of two or more primary particles that are aggregated and/or agglomerated. Similarly, the term "non-associated" refers to groupings of two or more primary particles that are free from aggregation and/or agglomeration.

As used herein, the term "aggregation" or "aggregated" refers to a strong association between primary particles. For example, the primary particles may be chemically bound to one another. The breakdown of aggregates into smaller particles (e.g., primary particles) is generally difficult to achieve. Similarly, the term "non-aggregated" refers to primary particles that are free of strong associations with other primary particles.

As used herein, the term "agglomeration" or "agglomerated" refers to a weak association of primary particles. For example, the primary particles may be held together by charge or polarity. The breakdown of agglomerates into smaller particles (e.g., primary particles) is less difficult than the breakdown of aggregates into smaller particles. Similarly, the term "non-agglomerated" refers to primary particles that are free of weak associations with other primary particles.

As used herein, the term "light management film" refers to an article having a microstructured surface with a regular repeating pattern of tips and grooves. The tips and grooves can be symmetrical or not symmetrical. The size, orientation, and distance between the tips and grooves can be uniform or non-uniform. The light management film is typically selected from a brightness enhancement film, reflective film, or turning film. Light management films are further described, for example, in U.S. Pat. Nos. 5,175,030 (Lu et al.), 5,183,597 (Lu), 5,771,328 (Wortman et al.), 5,917,664 (O'Neill et al), 5,919,551 (Cobb, Jr. et al.), 6,111,696 (Allen et al.), 6,280,063 B1 (Fong et al.), 6,356,39 B1 (Gardiner et al.), the disclosures of which are incorporated herein by reference.

As used herein, the term "hydrodynamic particle size" refers to the volume-average particle size of the zirconia particles in a liquid phase as measured by Photon Correlation Spectroscopy (PCS) using the method described herein.

As used herein, the term "hydrothermal" refers to a method of heating an aqueous medium, in a closed vessel, to a temperature above the normal boiling point of the aqueous medium at a pressure that is equal to or greater than the pressure required to prevent boiling of the aqueous medium.

As used herein, the term "index of refraction" or "refractive index" refers to the absolute refractive index of a material (e.g., organic matrix or coating composition) and is the ratio of the speed of electromagnetic radiation in free space to the speed of the electromagnetic radiation in the material of interest. The electromagnetic radiation is white light. The index of refraction is measured using an Abbe refractometer, available commercially, for example, from Fisher Instruments of Pittsburgh, Pa. The measurement of the refractive index can depend, to some extent, on the particular refractometer used.

As used herein, the term "(meth)acrylate" refers to both acrylate and methacrylate compounds.

As used herein, the term "microstructured" or "microstructure" refers to a surface having discontinuities such as projections and indentations that deviate in profile from the average center line drawn through the microstructure such that the sum of the areas embraced by a surface profile above the center line is equal to the sum of the areas below the line, with the line being essentially parallel to the nominal surface (bearing the microstructure) of the article. The heights of these deviations are typically at least 0.005 micron, at least 0.01 micrometers, or at least 0.1 micrometers. The heights of these deviations are typically no greater than 750 micrometers, no greater than 500 micrometers, no greater than 400 micrometers, no greater than 200 micrometers, or no greater than 100 micrometers. Some surface structures have a plurality of parallel longitudinal ridges extending along a length or width of the film. The ridges have a height of deviation from the center line of about 0.1 to about 100 micrometers. These ridges can form a pattern of alternating tips and grooves that can be symmetric or non-symmetric. The size, orientation, and distance between the tips and the grooves can be uniform or non-uniform. In some microstructured surfaces, the ridges can be formed from a plurality of prism apexes. These apexes can be sharp, rounded, flattened, or truncated.

As used herein, the term "micro-replication tool" refers to a tool that can be used to create a microstructured surface in a polymeric material. The micro-replication tool has a microstructure that is replicated by contacting the micro-replication tool with a polymerizable composition, a polymeric composition, or both. The micro-replication tool has a surface that is a negative to the surface formed in the replicated, microstructured surface in the polymeric material.

As used herein, the term "organic matrix" refers to any organic material and includes, for example, monomers, oligomers, polymers, solvents, cross-linking agents, initiators, and the like. The organic matrix can include combinations of these components.

As used herein, the terms "polymer" or "polymeric" or "polymeric material" refer to a material that is prepared by reacting one or more monomers. That is, the terms refer to both homopolymers, copolymers, and terpolymers. As used herein, the term "polymerize" refers to a reaction of forming a polymeric material from one or more monomers, oligomers, or mixtures thereof.

As used herein, the term "polymerizable composition" refers to a composition that includes monomer, oligomers, or mixtures thereof that are capable of undergoing a polymerization reaction to form a polymeric material. A polymerizable composition is a subset of an organic matrix.

As used herein, the term "primary particle size" refers to the size of a non-associated single crystal zirconia particle. X-ray Diffraction (XRD) is typically used to measure the primary particle size using the method described herein.

As used herein, the term "sol" refers to a dispersion or suspension of colloidal particles in a liquid phase (e.g., aqueous medium). The particles in the sol are typically non-agglomerated, non-aggregated, or a combination thereof.

As used herein, the term "zirconia" refers to various stoichiometries for zirconium oxides, most typically $ZrO_2$, and may also be known as zirconium oxide or zirconium dioxide. The zirconia may contain up to 30 weight percent of other chemical moieties such as, for example, yttrium oxide and organic material.

The above summary of the present invention is not intended to describe each disclosed embodiment or every implementation of the present invention. The Figure, Detailed Description and Examples that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
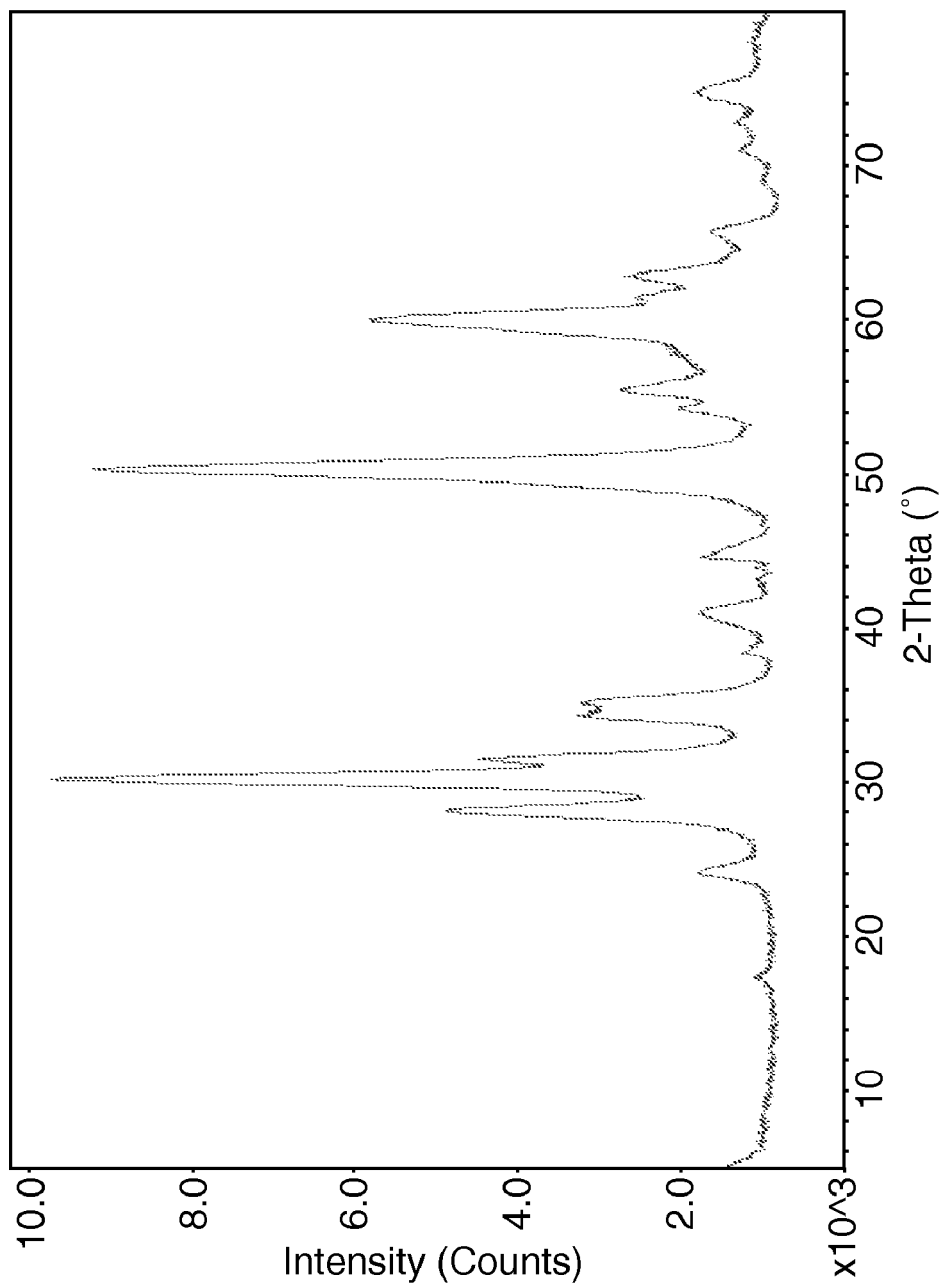
FIG. 1 is a representative x-ray diffraction pattern for exemplary zirconia particles.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Microstructured articles such as light management films are provided that contain zirconia particles. The zirconia particles are colloidal (e.g., less than 100 nanometers), crystalline, and substantially non-associated. The zirconia particles can increase the refractive index of the light management films, can increase the durability of the light management films, or a combination thereof. The light management films are typically in the form of brightness enhancement films, reflective films, turning films, and the like.

In a first aspect, light management films are provided that include an optical layer having a microstructured surface. The optical layer contains a polymeric material and a plurality of surface-modified zirconia particles. The zirconia particles contain 0.1 to 8 weight percent yttrium based on a weight of inorganic oxides in the zirconia particles. Further, the zirconia particles have an average primary particle size no greater than 50 nanometers, a dispersion index of 1 to 3, a ratio of intensity-average particle size to volume-average particle size no greater than 3.0, and a crystal structure that is at least 70 percent cubic, tetragonal, or a combination thereof.

The light management films with zirconia particles typically have a higher refractive index compared to light management films that contain only polymeric materials. In some embodiments, the light management film is a brightness enhancement film. In other embodiments, the light management film is a reflective film or a turning film.

The zirconia particles contain yttrium, which is often in the form of yttrium oxide. The amount of yttrium is in the range of 0.1 to 8 weight percent based on the weight of the inorganic oxides in the zirconia particles. For example, the amount of yttrium can be in the range of 0.5 to 8 weight percent, 1 to 5 weight percent, or 1 to 4 weight percent based on the weight of the inorganic oxides in the zirconia particles.

The zirconia particles often contain at least some organic material in addition to inorganic oxides. The organic material can be attached to the surface of the zirconia particles and often originates from the anions of the salts in the precursor solution used to prepare the zirconia particles. The zirconia particles often contain up to 15 weight percent, up to 12 weight percent, up to 10 weight percent, up to 8 weight percent, or up to 6 weight percent organic material based on the weight of the particles.

The zirconia particles are crystalline. Crystalline zirconia tends to have a higher refractive index than amorphous zirconia. Due to the difficulty in separately quantifying cubic and tetragonal crystal structures for small particles using x-ray diffraction (i.e., the (1 1 1) peak for cubic zirconia often overlaps with the (1 0 1) peak for tetragonal zirconia), these two crystal structures are combined. For example, the combination of these two peaks appears at about 30.5 degrees two theta in the x-ray diffraction pattern shown in FIG. 1. At least 70 percent of the zirconia particles have a cubic structure, tetragonal structure, or a combination thereof with the balance being monoclinic. For example, in some zirconia samples, at least 75 percent, at least 80 percent, or at least 85 percent of the zirconia particles have a cubic crystal structure, tetragonal crystal structure, or a combination thereof. Cubic and tetragonal crystal structures tend to promote the formation of low aspect ratio primary particles having a cube-like shape when viewed under an electron microscope.

The zirconia particles usually have an average primary particle size no greater than 50 nanometers, no greater than 40 nanometers, no greater than 30 nanometer, no greater than 25 nanometers, or no greater than 20 nanometers. The primary particle size, which refers to the non-associated particle size of the zirconia particles, can be determined by x-ray diffraction as described in the Examples section.

The particles of zirconia tend to exist in a substantially non-associated (i.e., non-aggregated and non-agglomerated) form when present in a sol. The extent of association between the primary particles can be determined from the hydrodynamic particle size. The hydrodynamic particle size is measured using Photon Correlation Spectroscopy and is described in more detail in the Examples section. The term "hydrodynamic particle size" and "volume-average particle size" are used interchangeably herein. If the particles of zirconia are associated, the hydrodynamic particle size provides a measure of the size of the aggregates and/or agglomerates of primary particles in the zirconia sol. If the particles of zirconia are non-associated, the hydrodynamic particle size provides a measure of the size of the primary particles.

A quantitative measure of the degree of association between the primary particles of zirconia within a sol is the dispersion index. As used herein the "dispersion index" is defined as the hydrodynamic particle size divided by the primary particle size. The primary particle size (e.g., the weighted average crystallite size) is determined using x-ray diffraction techniques and the hydrodynamic particle size (e.g., the volume-average particle size) is determined using Photon Correlation Spectroscopy. As the association between primary particles in the sol decreases, the dispersion index approaches a value of 1. The zirconia particles typically have a dispersion index of 1 to 5, 1 to 4, 1 to 3, 1 to 2.5, or 1 to 2.

Photon Correlation Spectroscopy can be used to further characterize the zirconia particles in a sol. For example, the intensity of the light scattered by particles is proportional to the sixth power of the particle diameter. Consequently, the light-intensity distribution tends to be more sensitive to larger particles than smaller ones. The intensity-average size (e.g., measured in nanometers) is, in effect, the size of a particle that corresponds to the mean value of the light intensity distribution measured by the instrument. The zirconia particles tend to have an intensity-average size that is no greater than 70 nanometers, no greater than 60 nanometers, no greater than 50 nanometers, no greater than 40 nanometers, no greater than 35 nanometers, or no greater than 30 nanometers.

The light-intensity distribution obtained during analysis using Photon Correlation Spectroscopy can be combined with the refractive indices of the particles and the refractive index of the suspending medium to calculate a volume distribution for spherical particles. The volume distribution gives the percentage of the total volume of particles corresponding to particles of a given size range. The volume-average size is the size of a particle that corresponds to the mean of the volume distribution. Since the volume of a particle is proportional to the third power of the diameter, this distribution is less sensitive to larger particles than the intensity-average size. That is, the volume-average size will typically be a smaller value than the intensity-average size. The zirconia sols typically have a volume-average size that is no greater than 50 nanometers, no greater than 40 nanometers, no greater than 30 nanometers, no greater than 25 nanometers, no greater than 20 nanometers, or no greater than 15 nanometers. The volume-average size is used in the calculation of the dispersion index.

For a sample that has particles of only one size, the intensity-average size and volume-average size will be the same. Therefore, the ratio of the intensity-average size to the volume-average size gives a measure of the spread of sizes in the particles. Larger ratios correspond to broader particle size distributions. The zirconia particles typically have a ratio of intensity-average size (i.e., measured in nanometers) to volume-average size (i.e., measured in nanometers) that is no greater than 3.0, no greater than 2.5, no greater than 2.0, no greater than 1.8, no greater than 1.7, or no greater than 1.6.

The zirconia sols often have a high optical transmission due to the small size and non-associated form of the primary zirconia particles in the sol. High optical transmission of the sol can be desirable in the preparation of transparent or translucent articles. As used herein, "optical transmission" refers to the amount of light that passes through a sample (e.g., a zirconia sol) divided by the total amount of light incident upon the sample and may be calculated using the following equation:

% Transmission=100($I/I_O$)

where I is the light intensity passing though the sample and $I_O$ is the light intensity incident on the sample. The optical transmission may be determined using an ultraviolet/visible spectrophotometer set at a wavelength of 600 nanometers with a 1 cm path length.

The optical transmission is a function of the amount of zirconia in a sol. For zirconia sols having about 1 weight percent zirconia, the optical transmission is typically at least 70 percent, at least 80 percent, or at least 90 percent. For zirconia sols having about 10 weight percent zirconia, the optical transmission is typically at least 20 percent, at least 50 percent, or at least 70 percent.

The zirconia particles are surface-modified. Surface modification involves reacting the zirconia particles with a surface modification agent or combination of surface modification agents that attach to the surface of the zirconia particles and that modify the surface characteristics of the zirconia particles.

The zirconia particles are often surface-modified to improve compatibility with the organic matrix material. The surface-modified zirconia particles are often non-associated, non-agglomerated, or a combination thereof in an organic matrix material. The resulting light management films that contain these surface-modified zirconia particles tend to have high optical clarity and low haze. The addition of these surface-modified zirconia particles can increase the gain of brightness enhancement film compared to films that contain only polymeric material.

Surface modification agents may be represented by the formula A-B where the A group is capable of attaching to the surface of a zirconia particle, and where B is a compatibilizing group. The A group can be attached to the surface by adsorption, formation of an ionic bond, formation of a covalent bond, or a combination thereof. Suitable examples of A groups include, for example, carboxylic acids or salts thereof, sulfonic acids or salts thereof, phosphoric acids or salts thereof, phosphonic acids and salts thereof, silanes, and the like. The compatabilizing group B can be reactive or nonreactive and can be polar or non-polar.

Compatibilizing groups B that can impart polar character to the zirconia particles include, for example, polyethers. Representative examples of polar modifying agents having carboxylic acid functionality include polyether carboxylic acids such as 2-[2-(2-methoxyethoxy)ethoxy]acetic acid (MEEAA), 2-(2-methoxyethoxy)acetic acid (MEAA), and mono(polyethylene glycol)succinate.

Compatibilizing groups B that can impart non-polar character to the zirconia particles include, for example, linear or branched aromatic or aliphatic hydrocarbons. Representative examples of non-polar modifying agents having carboxylic acid functionality include octanoic acid, dodecanoic acid, stearic acid, oleic acid, and combinations thereof.

In some embodiments, the carboxylic acid can be reactive with a polymerizable organic matrix (e.g., the carboxylic acid has a polymerizable group). In other embodiments, the carboxylic acid includes both a carboxylic acid with a polymerizable group and a carboxylic acid that is free of a polymerizable group. Reactive carboxylic acid surface modifying agents (e.g., carboxylic acids with polymerizable groups) include, for example, acrylic acid, methacrylic acid, beta-carboxyethyl acrylate, mono-2-(methacryloxyethyl)succinate, and combinations thereof. A useful surface modification agent that can impart both polar character and reactivity to the zirconia particles is mono(methacryloxypolyethyleneglycol) succinate. This material may be particularly suitable for addition to radiation curable acrylate and/or methacrylate organic matrix materials.

Exemplary silanes include, but are not limited to, alkyltrialkoxysilanes such as n-octyltrimethoxysilane, n-octyltriethoxysilane, isooctyltrimethoxysilane, dodecyltrimethoxysilane, octadecyltrimethoxysilane, propyltrimethoxysilane, and hexyltrimethoxysilane; methacryloxyalkyltrialkoxysilanes or acryloxyalkyltrialkoxysilanes such as 3-methacryloxypropyltrimethoxysilane, 3-acryloxypropyltrimethoxysilane, and 3-(methacryloxy)propyltriethoxysilane; methacryloxyalkylalkyldialkoxysilanes or acryloxyalkylalkyldialkoxysilanes such as 3-(methacryloxy)propylmethyldimethoxysilane, and 3-(acryloxypropyl)methyldimethoxysilane; methacryloxyalkyldialkylalkoxysilanes or acyrloxyalkyldialkylalkoxysilanes such as 3-(methacryloxy) propyldimethylethoxysilane; mercaptoalkyltrialkoxylsilanes such as 3-mercaptopropyltrimethoxysilane; aryltrialkoxysilanes such as styrylethyltrimethoxysilane, phenyltrimethoxysilane, phenyltriethoxysilane, and p-tolyltriethoxysilane; vinyl silanes such as vinylmethyldiacetoxysilane, vinyldimethylethoxysilane, vinylmethyldiethoxysilane, vinyltrimethoxysilane, vinyltriethoxysilane, vinyltriacetoxysilane, vinyltriisopropoxysilane, vinyltrimethoxysilane, vinyltriphenoxysilane, vinyltri-t-butoxysilane, vinyltris(isobutoxy)silane, vinyltriisopropenoxysilane, and vinyltris(2-methoxyethoxy)silane; 3-glycidoxypropyltrialkoxysilane such as glycidoxypropyltrimethoxysilane; polyether silanes such as N-(3-triethoxysilylpropyl)methoxyethoxyethoxyethyl carbamate (PEG3TES), N-(3-triethoxysilylpropyl)methoxyethoxyethoxyethyl carbamate (PEG2TES), and SILQUEST A-1230); and combinations thereof.

The optical layer of the light management film contains a polymeric material in addition to the surface-modified zirconia particles. The optical layer typically includes up to 80 weight percent surface-modified zirconia particles. In some embodiments, the optical layer includes up to 75 weight percent, up to 70 weight percent, up to 65 weight percent, up to 60 weight percent, up to 55 weight percent, up to 50 weight percent, up to 45 weight percent, or up to 40 weight percent surface-modified zirconia. The optical layer usually includes at least 1 weight percent, at least 5 weight percent, at least 10 weight percent, at least 15 weight percent, at least 20 weight percent, at least 25 weight percent, at least 30 weight percent, at least 35 weight percent, or at least 40 weight percent surface-modified zirconia particles. In some embodiment, the optical layer contains 1 to 80 weight percent, 1 to 70 weight percent, 1 to 60 weight percent, 5 to 60 weight percent, 10 to 60 weight percent, 20 to 60 weight percent, 30 to 60 weight percent, or 40 to 60 weight percent surface-modified zirconia particles.

The polymeric material in the optical layer can be any suitable material having a sufficiently high refractive index. The refractive index of the polymeric material is often at least 1.40, at least 1.45, or at least 1.50. The polymeric material can be formed, for example, by reacting a polymerizable composition that contains one or more monomers (e.g., ethylenically unsaturated monomers), one or more oligomers (e.g., ethylenically unsaturated oligomers), or a combination thereof. The polymerizable composition can also include an optional cross-linker and an optional photoinitiator.

Some exemplary polymeric materials are prepared from a polymerizable composition that includes oligomeric materials having both hard segments and soft segments. The hard segments are often polyurethanes and the soft segments are often polyesters. Additionally, the polymerizable composition often includes a monomer to provide a viscosity suitable for making microstructured articles (e.g., 1,000 to 5,000 cps). For example, the oligomeric resins are often acrylate-based and the monomers are ethylenically unsaturated monomers such as alkyl(meth)acrylates, aromatic (meth)acrylates, or combinations thereof. The polymerizable compositions are often solvent-free, cross-linkable, and curable with ultraviolet radiation in the presence of a photoinitiator. Such polymerizable compositions are further described, for example, in U.S. Pat. Nos. 5,183,597 (Lu) and 5,175,030 (Lu et al.), incorporated herein by reference.

Other exemplary polymeric materials are prepared from a polymerizable composition that includes an oligomeric material having a high refractive index, a reactive diluent, and a cross-linker (i.e., cross-linking agent or cross-linking monomer). The polymerizable composition often includes an initiator. The oligomeric material contributes bulk optical properties and durability to the polymeric material. The reactive diluent is a monomer that can be added to adjust the viscosity of the polymerizable composition. The viscosity is typically adjusted to be flowable enough to minimize the entrapment of air bubbles in the composition and to allow the formation of the full microstructure geometry. A multi-functional cross-linker is added to enhance the durability of the optical layer and can increase the glass transition temperature of the polymer (e.g., the glass transition temperature of the polymeric material is often greater than 45° C.). These exemplary polymeric materials are further described in U.S. Pat. Nos. 7,074,463, 7,179,513, and 7,289,202, incorporated herein by reference.

The oligomeric materials for these exemplary polymeric materials are often urethane acrylates, epoxy acrylates, or a combination thereof. Typical oligomeric materials include, but are not limited to, aromatic urethane acrylates (e.g., commercially available as EBECRYL 6700-20T from Surface Specialties, Smyrna, Ga.), aromatic urethane diacrylates (e.g., commercially available as EBECRYL 4849 and EBECRYL 4827 from Surface Specialties), aromatic urethane triacrylates (e.g., commercially available as EBECRYL 6602 from Surface Specialties), urethane acrylates (e.g., commercially available as CN972 from Sartomer), urethane acrylate blends (e.g., commercially available blended with tripropylene glycol diacrylate from Sartomer as CN970A60 and CN973A80), hexafunctional urethane acrylates (e.g., commercially available as CN975 from Sartomer and as EBECRYL 220 from Surface Specialties), bisphenol A epoxy diacrylates (e.g., commercially available as EBECRYL 608, EBECRYL 1608, and EBECRYL 3700 from Surface Specialties), modified bisphenol A epoxy diacrylates (e.g., EBECRYL 3701 from Surface Specialties), partially acrylated bisphenol A epoxy diacrylates (e.g., commercially available as EBECRYL 3605), epoxy acrylates (e.g., commercially available as CN120 and CN104 from Sartomer, Exton, Pa. and as EBECRYL 3200 from Surface Specialties), modified epoxy acrylates (e.g., commercially available as CN115, CN116, CN117, CN118, and CN119 from Sartomer), aliphatic/aromatic epoxy acrylates (e.g., commercially available as EBECRYL 3201 from Surface Specialties), and rubber modified epoxy diacrylates (e.g., commercially available as EBECRYL 3302 from Surface Specialties).

Typical reactive diluent monomers for these exemplary polymeric materials include, but are not limited to, monoacrylates such as phenylthio ethyl(meth)acrylate, isooctyl acrylate (e.g., commercially available as SR-440 from Sartomer, Exton, Pa.), isodecyl acrylate (e.g., commercially available as SR-395 from Sartomer), isobornyl acrylate (e.g., commercially available as SR-506 from Sartomer), 2-phenoxyethyl acrylate (e.g., commercially available as SR-339 from Sartomer), alkoxylated tetrahydrofurfuryl acrylate (e.g., commercially available as CD-611 from Sartomer), and 2(2-ethoxyethoxy)ethylacrylate (e.g., commercially available as SR-256 from Sartomer); diacrylates such as 1,3-butylene glycol diacrylate (e.g., commercially available as SR-212 from Sartomer), 1,6-hexanediol diacrylate (e.g., commercially available as SR-238 from Sartomer), neopentyl glycol diacrylate (e.g., commercially available as SR-247 from Sartomer), and diethylene glycol diacrylate (e.g., commercially available as SR-230 from Sartomer). Other reactive diluent monomers include, for example, methyl styrene, styrene, divnyl benzene, and the like.

Typical multi-functional cross-linkers for these exemplary polymeric materials are triacrylates, tetracarylates, and pentaacrylates. Such cross-linkers include, but are not limited to, trimethylolpropane triacrylate (e.g., commercially available as TMPTA-N from Surface Specialties, Smyrna, Ga. and as SR-351 from Sartomer, Exton, Pa.), a mixture of pentaerythritol triacrylate and pentaerythritol tetraacrylate (e.g., commercially available from Surface Specialties as PETIA with an approximately 1:1 ratio of tetraacrylate to triacrylate and as PETA-K with an approximately 3:1 ratio of tetraacrylate to triacrylate), pentaerythritol tetraacrylate (e.g., commercially available as SR-295 from Sartomer), pentaerythritol triacrylate (e.g., commercially available as SR-444 from Sartomer), tris-(2-hydroxy ethyl) isocyanurate triacrylate (e.g., commercially available as SR-368 from Sartomer), di-trimethylolpropane tetraacrylate (e.g., commercially available as SR-355 from Sartomer), and dipentaertythritol pentaacrylate (e.g., commercially available as SR-399 from Sartomer).

These polymerizable compositions are typically polymerized using a free radical polymerization method. There is often an initiator included in the polymerizable composition. The initiator can be a thermal initiator, a photoinitiator, or both. Examples of initiators include organic peroxides, azo compounds, quinines, nitro compounds, acyl halides, hydrazones, mercapto compounds, pyrylium compounds, imidazoles, chlorotriazines, benzoin, benzoin alkyl ethers, di-ketones, phenones, and the like. Commercially available photoinitiators include, but are not limited to, 2-hydroxy-2-methyl-1-phenyl-propane-1-one (e.g., commercially available as DAROCUR 1173 from Ciba Specialty Chemicals), a mixture of 2,4,6-trimethylbenzoyl-diphenyl-phosphine oxide and 2-hydroxy-2-methyl-1-phenyl-propan-1-one (e.g., commercially available as DARACUR 4265 from Ciba Specialty Chemicals), 2,2-dimethoxy-1,2-diphenylethan-1-one (e.g., commercially available as IRGACURE 651 from Ciba Specialty Chemicals), a mixture of bis(2,6-dimethoxybenzoyl)-2,4,4-trimethyl-pentylphosphine oxide and 1-hydroxycyclohexyl-phenyl-ketone (e.g., commercially available as IRGACURE 1800 from Ciba Specialty Chemicals), a mixture of bis(2,6-diemethoxybenzoyl)-2,4,4-trimethyl-pentylphosphine oxide (e.g., commercially available as IRGACURE 1700 from Ciba Specialty Chemicals), 2-methyl-1[4-(methylthio)phenyl]-2-morpholinopropan-1-one (e.g., commercially available as IRGACURE 907 from Ciba Specialty Chemicals), and bis(2,4,6-trimethylbenzoyl)-phenylphosphine oxide (e.g., commercially available as IRGACURE 819 from Ciba Specialty Chemicals), ethyl 2,4,6-trimethylbenzoyldiphenyl phosphinate (e.g., commercially available from BASF, Charlotte, N.C. as LUCIRIN TPO-L), and 2,4,6-trimethylbenzoyldiphenylphosphine oxide (e.g., commercially available from BASF, Charlotte, N.C. as LUCIRIN TPO). The photoinitiator is often used at a concentration of about 0.1 to 10 weight percent or 0.1 to 5 weight percent based on the weight of oligomeric and monomer material in the polymerizable composition.

Polymeric materials that are prepared by reacting an oligomeric material, an optional monomer to lower the viscosity, and a photoinitiator are described in U.S. Pat. No. 6,844,950 B2 (Chisholm et al.), incorporated herein by reference. Suitable oligomers are urethane multi(meth)acrylates. An exemplary polymeric material is prepared by reacting 2,2,4-trimethylhexylene diisocyanate, poly(caprolactone)diol, and 2-hydroxyethyl methacrylate. Suitable optional monomers include, for example, alkyl(meth)acrylates, N-substituted (meth)acrylamides, N,N'-disubstituted (meth)acrylamides, styrene compounds, and the like.

Other exemplary polymeric materials are the reaction product of a polymerizable composition that includes a monomer of Formula I.

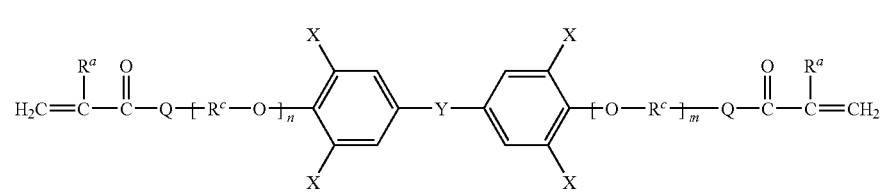

In Formula I, $R^a$ is hydrogen or methyl; Q is oxy or thio; $R^c$ is a $C_2$ to $C_{12}$ alkylene that is unsubstituted or substituted with a hydroxy; n is an integer of 0 to 6; m is an integer of 0 to 6; each X is independently hydrogen, bromo, or chloro; and Y is a divalent linking group selected from $—C(CH_3)_2—$, $—CH_2—$, $—S—$, $—S(O)—$, or $—S(O)_2—$. Polymerizable compositions that include a monomer of Formula I are further described in U.S. Pat. Nos. 6,541,591 B2 (Olson et al.) and 6,833,391 B1 (Chisholm et al.); and U.S. Patent Publication Nos. 2004/0249100 A1 (Chisholm et al.) and 2004/0242720 A1 (Chisholm et al.), all incorporated herein by reference. Additional monomers or oligomers can be added to the polymerizable compositions. These polymerizable compositions can further include cross-linking agents and initiators such a photoinitiators.

In some embodiments of Formula I, $R^c$ is a $C_2$ to $C_3$ alkylene that is unsubstituted or substituted with a hydroxy; n is equal to 0 or 1; and m is equal to 0 or 1. For example, $R^c$ can be selected from $—CH_2CH_2—$, $—CH(CH_3)CH_2—$, or $—CH_2CH(OH)CH_2—$.

The monomers of Formula I can be prepared by the reaction of a (meth)acrylic acid with a di-epoxide such as, for example, bisphenol-A diglycidyl ether; bisphenol-F diglycidyl ether; tetrabromo bisphenol-A diglycidyl ether; 1,3-bis-{4-[1-methyl-1-(4-oxiranylmethoxy-phenyl)-ethyl]-phenoxy}-propan-2-ol; 1,3-bis-{2,6-dibromo-4-[1-(3,5-dibromo-4-oxiranylmethoxy-phenyl)-1 methyl-ethyl]-phenoxy}-propan-2-ol, and the like.

Exemplary monomers of Formula I include, but are not limited to, 2,2-bis(4-(2-(meth)acryloxyethoxy)phenyl)propane; 2,2-bis((4-(meth)acryloxy)phenyl)propane: acylid acid 3-(4-{1-[4-(3-acryloyloxy-2-hydroxy-propoxy)-3,5-dibromo-phenyl]-1-methyl-ethyl}-2,6-dibromo-phenoxy)-2-hydroxy-propyl ester; acrylic acid 3-[4-(1-{4-(3-acryloyloxy-2-hydroxy-propoxy)-3,5-dibromo-phenyl]-1-methyl-ethyl}-2,6-dibromo-phenoxy)-2-hydroxy-propyl ester; acrylic acid 3-[4-(1-{4-[3-(4-{1-4-(3 acryloxyloxy-2-hydroxy-propoxy)-3,5-dibromo-phenyl]-1-methyl-ethyl}-2,6-dibromo-phenoxy)-2-hydroxy-propoxy]-3,5-dibromo-phenyl}-1methyl-ethyl)-2,6-dibromo-phenoxy]-2-hydroxypropyl ester; and the like. In some polymerizable compositions, the monomer of Formula I includes the reaction product of tetrabromobisphenol A diglycidyl ether and acrylic acid to form 2-propenoic acid, (1-methylethylidiene)bis[2,6-d]bromo-4,1-phenylene)oxy(2-hydroxy-3,1-proanediyl)]ester.

The cross-linking monomers used in combination with monomers of Formula I or in other polymeric compositions describe herein often include three or more (meth)acryloyl groups. Such cross-linkers include, but are not limited to, trimethylolpropane triacrylate, pentaerythritol triacrylate, pentaerythritol tetraacrylate, isocyanurate triacrylate, di-(tri-methylolpropane) tetraacrylate, dipentaerythritol pentaacrylate, and the like. Mixtures of cross-linkers can be used.

The polymerizable composition that contains a monomer of Formula I can also include a monofunctional (meth)acrylate. In some such polymerizable compositions, the monofunctional (meth)acrylate is of Formula II.

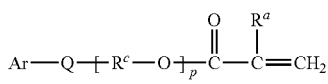

II

In Formula II, Ar is a phenyl or naphthyl that is unsubstituted or substituted with one or more substituents selected from halo, alkyl, aryl, aralkyl, or combination thereof, Q is oxy or thio; $R^c$ is a $C_2$ to $C_{12}$ alkylene that is unsubstituted or substituted with a hydroxy; p is an integer of 0 to 6; and $R^a$ is hydrogen or methyl.

Exemplary monomers of Formula II include, but are not limited to, phenoxyethyl (meth)acrylate, phenoxy-2-methylethyl(meth)acrylate, phenoxyethoxyethyl (meth)acrylate, 3-phenoxy-2-hydroxypropyl(meth)acrylate, 2,4-dibromophenoxyethyl (meth)acrylate, 2,4,6-tribromophenoxyethyl(meth)acrylate, 4,6-dibromo-2-alkyl phenyl (meth)acrylate, 2,6-dibromo-4-alkyl phenyl(meth)acrylate, 2-(1-naphthyloxy)ethyl (meth)acrylate, 2-(2-naphthyloxy)ethyl (meth)acrylate, 2-(1-naphthylthio)ethyl (meth)acrylate, 2-(2-naphthylthio)ethyl(meth)acrylate, and the like.

In a first example, the polymerizable composition can include a monomer of Formula I, 2,4,6-tribromophenoxyalkyl(meth)acrylate, and an aromatic urethane hexaacrylate. Such polymerizable compositions are further described in U.S. Pat. No. 5,908,875 (Fong et al.), incorporated herein by reference.

In a second example, the polymerizable composition can include a monomer of Formula I, an alkyl substituted 4,6-dibromophenyl acrylate, methyl styrene, and an aromatic urethane hexaacrylate. Such polymerizable compositions are further described in U.S. Pat. No. 6,280,063 B1 (Fong et al.), incorporated herein by reference.

In a third example, the polymerizable composition includes a first monomer of Formula I, a second monomer that includes 2,4,6-tribromophenoxyalkyl(meth)acrylate (e.g., 2,4,6-tribromophenoxyethyl(meth)acrylate), and a cross-linking agent (e.g., pentaerythritol tri(meth)acrylate, pentaerythritol tetra(meth)acrylate, trimethylolpropane tri(meth)acrylate, or mixtures thereof). The polymerizable composition can also include a photoinitiator and a monofunctional reactive diluent monomer (e.g., phenoxyethyl (meth)acrylate, benzyl(meth)acrylate, and mixtures thereof). This polymerizable composition is further described in U.S. Publication No. 2005/0148735, incorporated herein by reference.

In yet another specific example, the polymerizable composition includes a first monomer of Formula I, a second monomer that includes a monofunctional reactive diluent monomer such as phenoxyalkyl(meth)acrylate (e.g., phenoxyethyl acrylate), a cross-linking agent (e.g., pentaerythritol tri(meth)acrylate, pentaerythritol tetra(meth)acrylate, trimethylolpropane tri(meth)acrylate, or mixtures thereof), and a photoinitiator. This polymerizable composition is further described in U.S. Publication No. 2005/0147838.

Other polymeric materials include those prepared by reacting a polymerizable composition that includes a monomer of Formula II but not a monomer of Formula I. The monomer of Formula II can be combined, for example, with an optional cross-linking monomer and an optional initiator such as a photoinitiator.

For example, the polymeric materials can be formed by reacting a polylmerizable composition that contains an alkyl-substituted, brominated phenyl(meth)acrylate (i.e., the variable p in Formula II is equal to zero). Such polymerizable compositions are further described in U.S. Pat. Nos. 5,932,626 (Fong et al.), 6,107,364 (Fong et al.), and 6,355,854 (Olson et al.), incorporated herein by reference. Exemplary alkyl-substituted, brominated monomers include, for example, 4,6-dibromo-2-alkyl phenyl(meth)acrylate such as 4,6-dibromo-2-sec-butyl phenyl(meth)acrylate, 4,6-dibromo-2-tert-butyl phenyl (meth)acrylate and 4,6-dibromo-2-isopropyl phenyl(meth)acrylate; 2,6-dibromo-4-alkyl phenyl(meth)acrylate such as 2,6-dibromo-4-nonyl phenyl (meth)acrylate and 2,6-dibromo-4-dodecyl phenyl(meth)acrylate.

Some polymerizable compositions that include an alkyl-substituted, brominated phenyl(meth)acrylate can also include a comonomer having a high index of refraction such as methyl styrene; a brominated aromatic monomers such as tribromophenyl (meth)acrylate or pentabromophenyl(meth)acrylate; or another monomer according to Formula II where Ar is an unsubstituted phenyl or a phenyl substituted with an alkyl, aryl, aralkyl, or a combination thereof. For example, the polymerizable composition can include an alkyl-substituted, brominated phenyl(meth)acrylate, methyl styrene, a brominated epoxy diacrylate, 2-phenoxyethyl acrylate, and an aromatic urethane hexaacryate, as described in U.S. Pat. No. 6,355,754 (Olson et al.), incorporated herein by reference.

Other polymerizable compositions that include a monomer of Formula II but not a monomer of Formula I are further described in U.S. Pat. No. 6,663,978 B1 (Olson et al.), incorporated herein by reference. These monomers include, but are not limited to, 6-(4,6-dibromo-2-isopropyl-phenoxy)hexyl acrylate, 6-(4,6-dibromo-2-sec-butyl phenoxy)hexyl acrylate, 2-(1-napthyloxy)ethyl acrylate, 2-(2-naphthyloxy)ethyl acrylate, 6-(1-naphthyloxy)hexyl acrylate, 6-(2-napthyloxy) hexyl acrylate, 8-(1-naphthyloxy)octyl acrylate, 8-(2-naphthyloxy)octyl acrylate, 2-phenylthioethyl acrylate, phenoxyethyl acrylate, and combinations thereof.

Yet other polymeric materials can be formed from an aromatic, thio-containing diacrylate such as those described in U.S. Publication No. 2006/0147702, incorporated herein by reference. The aromatic thio-containing diacrylate can be of Formula III or Formula IV.

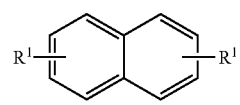

III

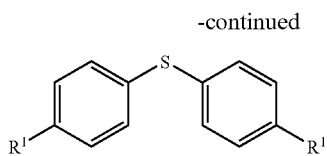

In both Formula I and Formula II, each $R^1$ is independently selected from a formula of

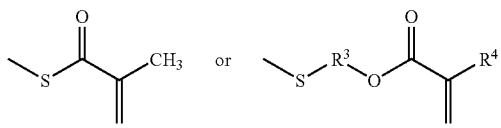

where $R^3$ is $(CH_2)_x$; x is an integer of 2 to 8; and $R^4$ is hydrogen or methyl. The polymerizable material can also include a cross-linking monomer. Suitable monomers according to Formula III include, but are not limited to, acrylic acid 2-[7-(2-acryloyloxy-ethylsulfanyl)-naphthalen-2-ylsulfanyl]-ethyl ester. Suitable monomers according to Formula IV include, but are not limited to, acrylic acid 2-{4-[4-(2-acryloyloxy-ethylsulfanyl)-phenylsulfanyl]-phenylsulfanyl}-ethyl ester.

Other polymeric materials can be formed from an aromatic, thio-containing diacrylate of Formula V.

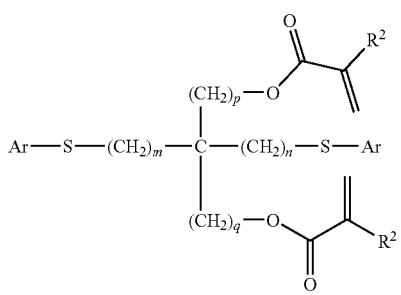

In Formula V, $R^2$ is hydrogen or methyl, Ar is an aryl (e.g., phenyl or naphthyl); m is an integer of 1 to 6, n is an integer of 1 to 6, p is an integer of 1 to 6, and q is an integer of 1 to 6. Suitable monomers according to Formula V include, but are not limited to, acrylic acid 2-acryloyloxymethyl-3-(naphthalene-2-ylsulfanyl)-2-(naphthalene-2-ylsulfanylmethyl)-propyl ester and acrylic acid 2-acryloyloxymethyl-3-phenylsulfanyl-2-phenylsulfanylmethyl-propyl ester.

Still other suitable polymeric materials are described in U.S. Patent Publication 2004/0131826 A1 (Chisholm et al.), incorporated herein by reference. The polymeric material is the reaction product of (a) at least one monofunctional acrylic monomer selected from (1) a tertiary-alkyl(meth)acrylate, (2) a N-substituted or N,N-disubstituted (meth)acrylamide, or (3) a $C_1$ to $C_8$ primary or secondary alkyl(meth)acrylate; (b) at least one multifunctional (meth)acrylate; (c) optionally at least one oligomeric material; and (d) at least one photoinitiator.

Suitable tertiary-alkyl(methacrylates) in component (a) are typically those having four to eight carbon atoms such as tert-butyl(meth)acrylate. Suitable N-substituted or N,N-disubstituted (meth)acrylamides in component (a) include, for example, alkyl substituents having one to four carbon atoms such as N-isopropylacrylamide, N-tert-butylacrylamide, N,N-dimethylacrylamide, and N,N-diethylacrylamide. Suitable $C_1$ to $C_8$ primary or secondary alkyl(meth)acrylates in component (a) include, for example, methyl (meth)acrylate, ethyl acrylate, and 2-(N-butylcarbamyl)ethyl acrylate.

Multifunctional (meth)acrylates for component (b) include, for example, ethylene glycol diacrylate, 1,6-hexanediol diacrylate, trimethylolpropane triacrylate, di(trimethylolpropane) tetraacrylate, pentaerythritol tetraacrylate, and N,N'-methylenebisacrylamide.

Although the polymeric material included in the optical layer of the light management films is often cross-linked (i.e., the polymeric material is a thermoset material), thermoplastic material can be used as well as describe in U.S. Patent Publication 2004/0233526 A1 (Kaminsky et al.), incorporated herein by reference. Suitable thermoplastics include acrylics, polyolefins, polyesters (e.g., polyesters formed by reaction of aromatic, aliphatic, or cycloaliphatic dicarboxylic acids having 4 to 40 carbon atoms with aliphatic or alicyclic glycols having 2 to 24 carbon atoms), polyamides (e.g., nylon 6 and nylon 66), polycarbonates (e.g., bisphenol-A polycarbonate), cellulosic esters (e.g., cellulose nitrate, cellulose triacetate, cellulose diacetate propionate, and cellulose acetate butyrate), polystyrene, polyvinyl resins (e.g., polyvinyl chloride and polyvinyl acetate), polysulfonamides, polyethers, polyimides, polyvinylidene fluoride, polyurethanes, polyphenylene sulfides, polytetrafluoroethylene, polyacetals, polysulfonates, polyester ionomers, and polyolefin ionomers. Copolymers (e.g., polyethylene vinyl acetate) or mixtures of these thermoplastic materials can also be used.

The polymerizable compositions described herein can also contain one or more other useful components. For example, the polymerizable composition can include one or more surfactants, pigments, fillers, polymerization inhibitors, antioxidants, anti-static agents, and the like. Such components can be included in amounts known to be effective. Surfactants such as fluorochemical surfactants can be included in the polymerizable composition to reduce surface tension, improve wetting, improve the smoothness of a coating, or to reduce the number of coating defects.

The optical layer can have a structured or microstructured surface that can have any of a number of useful patterns as described below and shown in the FIGURES. The microstructured surface can be a plurality of parallel longitudinal ridges extending along a length or width of the film. These ridges can be formed from a plurality of prism apexes. These apexes can be sharp, rounded, flattened, or truncated. The prismatic patterns can be regular or irregular. The prismatic pattern can be an annular prismatic pattern, a cube-corner pattern, or any other lenticular microstructure. A useful microstructure is a regular prismatic pattern that can provide a light management film that can function as a totally internal reflecting film. Another useful microstructure is a corner-cube prismatic pattern that can act as a retro-reflecting film or element for use as reflecting film. Another useful microstructure is a prismatic pattern that can act as an optical element for use in an optical display. Another useful microstructure is a prismatic pattern that can act as an turning film or element for use in an optical display.

In addition to the optical layer, many light management films further include a base layer. The optical layer can directly contact the base layer or be optically coupled to the base layer (i.e., there can be one or more intervening layers between the optical layer and the base layer). The base layer can be of a size, shape, and thickness that allow the optical layer to direct or concentrate the flow of light. The base layer can be of a nature and composition suitable for use in an optical product, i.e. a product designed to control the flow of light. Almost any material can be used as a base layer as long as the material is sufficiently optically clear and is structurally strong enough to be assembled into or used within a particular optical product. Preferably, a base layer material is chosen that has sufficient resistance to temperature and aging that performance of the optical product is not compromised over time.

The particular chemical composition and thickness of the base layer for any optical product can depend on the requirements of the particular optical product that is being constructed. That is, the material can be chosen, for example, by balancing the needs for strength, clarity, temperature resistance, surface energy, adherence to the optical layer, and the like.

Useful base layer materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene terephthalate, polyethylene naphthalate, copolymers or blends based on naphthalene dicarboxylic acids, polycyclo-olefins, polyimides, and glass. Optionally, the base material can contain mixtures or combinations of these materials. The base layer can contain one or more layers of material. In some embodiments, the base layer includes a dispersed phase suspended or dispersed in a continuous phase.

For some light management films, exemplary base layers are selected from polyethylene terephthalate (PET) and polycarbonate. Examples of useful PET films include photo-grade polyethylene terephthalate and MELINEX™ PET available from DuPont Films of Wilmington, Del.

Some base layer materials can be optically active, and can act as polarizing materials. A number of base layers, also referred to herein as films or substrates, are known in the optical product art to be useful as polarizing materials. Polarization of light through a film can be accomplished, for example, by the inclusion of dichroic polarizers in a film material that selectively absorbs passing light. Light polarization can also be achieved by including inorganic materials such as aligned mica chips or by including a discontinuous phase dispersed within a continuous film, such as droplets of light modulating liquid crystals dispersed within a continuous film. As an alternative, a polarizing film can be prepared from microfine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. Nos. 5,825,543 (Ouderkirk et al.) and 5,783,120 (Ouderkirk et al.), all incorporated herein by reference. The use of these polarizer films in combination with a brightness enhancing film has been described in U.S. Pat. No. 6,111,696 (Allen et al.), incorporated by reference herein.

Other examples of polarizing films that can be used as a base layer are described in U.S. Pat. No. 5,882,774 (Jonza et al.), incorporated herein by reference. One example of such films that are available commercially are the multilayer films sold under the trade designation DBEF (Dual Brightness Enhancement Film) from 3M, Saint Paul, Minn. The use of such multilayer polarizing light management film in a brightness enhancing film has been described in U.S. Pat. No. 5,828,488 (Ouderkirk et al.), incorporated herein by reference.

This list of base layer materials and other polarizing or non-polarizing films can also be used with the optical layers described above. These base layer can be combined with any number of other films including, for example, polarizing films to form multilayer structures. A short list of additional base materials can include those films described in U.S. Pat. Nos. 5,612,820 (Schrenk et al.) and 5,486,949 (Schrenk et al.), among others. The thickness of a particular base can also depend on the above-described requirements of the optical product.

Another aspect of the invention provides methods of making light management films. A first method includes providing a zirconia sol that contains zirconia particles dispersed in an aqueous phase, modifying the surface of the zirconia particles to form surface-modified zirconia particles, preparing a coating composition that contains the surface-modified zirconia particles and an organic matrix, contacting the coating composition with a micro-replication tool, and polymerizing the coating composition to form an optical layer having a microstructured surface. The zirconia sol is formed by preparing a first feedstock that contains a zirconium salt, subjecting the first feedstock to a first hydrothermal treatment to form a zirconium-containing intermediate and a byproduct, forming a second feedstock by removing at least a portion of the byproduct of the first hydrothermal treatment, and subjecting the second feedstock to a second hydrothermal treatment.

The zirconia particles can be prepared using hydrothermal technology. More specifically, a first feedstock that contains a zirconium salt is subjected to a first hydrothermal treatment to form a zirconium-containing intermediate and a byproduct. A second feedstock is prepared by removing at least a portion of the byproduct formed during the first hydrothermal treatment. The second feedstock is then subjected to a second hydrothermal treatment to form a zirconia sol that contains the zirconia particles.

The first feedstock is prepared by forming an aqueous precursor solution that contains a zirconium salt. The anion of the zirconium salt is usually chosen so that it can be removed during subsequent steps in the process for preparing the zirconia sol. Additionally, the anion is often chosen to be non-corrosive, allowing greater flexibility in the type of material chosen for the processing equipment such as the hydrothermal reactors.

The anion of the zirconium salt is usually a carboxylate. At least 50 mole percent of the carboxylate anions have no greater than four carbon atoms. For example, in some precursor solutions, at least 60 mole percent, at least 70 mole percent, at least 80 mole percent, at last 90 mole percent, at least 95 mole percent, at least 98 mole percent, or at least 99 mole percent of the carboxylate anions have no greater than four carbon atoms.

Suitable carboxylates having no greater than four carbon atoms include formate, acetate, propionate, butyrate, or a combination thereof. These carboxylate anions can often be removed during the process by conversion to the corresponding volatile acid. Further, these carboxylate anions are often more compatible with an organic matrix material compared to other anions such as chlorides or nitrates.

In some precursor solutions, the anion is a mixture of a carboxylate having no greater than four carbon atoms and a polyether carboxylate anion. Suitable polyether carboxylate anions are the corresponding weak bases of water-soluble monocarboxylic acids (i.e., one carboxylic acid group per molecule) having a polyether tail. The polyether tail contains repeating difunctional ether radicals having the general formula —O—R— where R is an alkylene group such as, for example, methylene, ethylene and propylene (including n-propylene and iso-propylene) or a combination thereof. Suitable polyether carboxylates have more than four carbon atoms and include, but are not limited to, those formed from polyether carboxylic acids such as 2-[2-(2-methoxyethoxy) ethoxy]acetic acid (MEEAA) and 2-(2-methoxyethoxy)acetic acid (MEAA). The polyether carboxylate, if included in the precursor solution, is typically present in an amount no greater than 50 mole percent based on the moles of carboxylate anions in the precursor solution. For example, the amount of polyether carboxylate can be no greater than 40 mole percent, no greater than 30 mole percent, no greater than 20 mole percent, no greater than 10 mole percent, no greater than 5 mole percent, no greater than 2 mole percent, or no greater than 1 mole percent of the carboxylate anions in the precursor solution.

Some precursor solutions are substantially free of polyether carboxylates, substantially free of carboxylates that have more than four carbon atoms, or a combination thereof. As used herein, the term "substantially free of polyether carboxylates" means that less than 1 mole percent of the carboxylate in the precursor solution are polyether carboxylates or the corresponding polyether carboxylic acid. For example, less than 0.5 mole percent, less than 0.2 mole percent, or less than 0.1 mole percent of the carboxylates in the precursor solution are polyether carboxylates or the corresponding polyether carboxylic acid. As used herein, the term "substantially free of carboxylates that have more than four carbon atoms" means that less than 1 mole percent of the carboxylates or the corresponding carboxylic acids in the precursor solution have greater than four carbon atoms. For example, less than 0.5 mole percent, less than 0.2 mole percent, or less than 0.1 mole percent of the carboxylates or corresponding carboxylic acids have greater than four carbon atoms.

Some precursor solutions are substantially free of halides such as chlorides. As used herein, the term "substantially free of halides" means that the precursor solution has less than $10^{-2}$ moles/liter, less than $10^{-3}$ moles/liter, less than $10^{-4}$ moles/liter, or less than $10^{-5}$ moles/liter halide.

The zirconium salt is often zirconium acetate. Zirconium acetate can be represented by a formula such as $ZrO_{((4-n)/2)}{}^{n+}(CH_3COO^-)_n$, where n is in the range of 1 to 2. The zirconium ion may be present in a variety of structures depending, for example, on the pH of the precursor solution. Methods of making zirconium acetate are described, for example, in W. B. Blumenthal, "The Chemical Behavior of Zirconium," pp. 311-338, D. Van Nostrand Company, Princeton, N.J. (1958). Suitable aqueous solutions of zirconium acetate are commercially available, for example, from Magnesium Elektron, Inc. (Flemington, N.J.) that contain up to 17 weight percent zirconium, up to 18 weight percent zirconium, up to 20 weight percent zirconium, or up to 22 weight percent zirconium.

Some precursor solutions contain an yttrium salt in addition to a zirconium salt. As with the zirconium salt, the anion of the yttrium salt is typically chosen to be removable during subsequent processing steps and to be non-corrosive. The anion of the yttrium salt is often a carboxylate having no more than four carbon atoms. For example, the anion can be acetate. The yttrium salt is often present in an amount up to 0.12 grams yttrium per gram of zirconium, up to 0.10 grams yttrium per gram of zirconium, up to 0.08 grams yttrium per gram of zirconium, up to 0.06 grams yttrium per gram of zirconium, or up to 0.04 grams yttrium per gram of zirconium.

The liquid phase of the precursor solution is typically predominately water. However, other miscible co-solvents can be included in the liquid phase in amounts up 20 weight percent based on the weight of the liquid phase. Suitable co-solvents include, but are not limited to, 1-methoxy-2-propanol, ethanol, isopropanol, ethylene glycol, N,N-dimethylacetamide, and N-methylpyrrolidone.

In some embodiments, the first feedstock is prepared by forming an aqueous precursor solution that includes a zirconium salt and an optional yttrium salt and then removing at least a portion of the anions in the precursor solution. Any suitable method known in the art for removing a portion of the anions can be used. Removal methods include, but are not limited to, vaporization, dialysis, ion exchange, precipitation, filtration, and the like. In some removal methods, the anion is removed as an acid. Although not wanting to be bound by theory, the partial removal of the anion in the precursor solution may reduce the formation of agglomerates and aggregates during one or more of the subsequent hydrothermal treatment steps.

In one method of at least partially removing the anions in the precursor solution, the precursor solution can be heated to vaporize an acidic form of the anion. For example, a carboxylate anion having no more than four carbon atoms can be removed as the corresponding carboxylic acid. More specifically, an acetate anion can be removed as acetic acid. The heating also can at least partially remove the liquid phase (e.g., aqueous medium) of the precursor solution in addition to the carboxylic acid. The partial removal of the liquid phase results in the formation of a concentrated precursor. In some methods, the solids can be increased up to 25 weight percent, up to 50 weight percent, up to 75 weight percent, or up to 100 weight percent. The concentrated precursor often contains at least 10 weight percent zirconium, at least 15 weight percent zirconium, at least 20 weight percent zirconium, at least 25 weight percent zirconium, at least 30 weight percent zirconium, at least 35 weight percent zirconium, or at least 40 weight percent zirconium. For example, the concentrated precursor can contain 11 to 43 weight percent zirconium or 21 to 43 weight percent zirconium.

All or a portion of the liquid phase removed to form the concentrated precursor can be replaced prior to the first hydrothermal treatment. The concentrated precursor can be diluted with water (e.g., deionized water) to provide the first feedstock. The first feedstock can have a solid content that is lower than the solid content of the precursor solution, equal to the solid content of the precursor solution, or greater than the solid content of the precursor solution.

The first feedstock typically has solids in the range of 0.5 to 20 weight percent or 2 to 15 weight percent. The first feedstock often contains at least 0.2 weight percent zirconium, at least 0.5 weight percent zirconium, at least 1 weight percent zirconium, or at least 2 weight percent zirconium. In some embodiments, the first feedstock contains up to 6 weight percent zirconium, up to 8 weight percent zirconium, or up to 9 weight percent zirconium. For example, the first feedstock often contains 0.2 to 9 weight percent zirconium or 1 to 6 weight percent zirconium.

The pH of the first feedstock is typically in the acidic range. For example, the pH is usually less than 6, less than 5, less than 4, or less than 3.

The first feedstock is subjected to a first hydrothermal treatment. The zirconium species in the first feedstock undergoes partial hydrolysis to form a zirconium-containing intermediate and a byproduct. Likewise, any optional yttrium salt present in the first feedstock can undergo partial hydrolysis. The hydrolysis reaction is often accompanied by the release of an acidic byproduct when the anion is a carboxylate. For example, if the anion is formate, acetate, propionate, or butyrate, the corresponding acid (i.e., formic acid, acetic acid, propionic acid, or butyric acid respectively) can be released during the hydrolysis reaction.

The hydrothermal treatments can be in a batch reactor or a continuous reactor. The residence times are typically shorter and the temperatures are typically higher in a continuous reactor compared to a batch reactor. The time of the hydrothermal treatments can be varied depending on the temperature of the reactor and the concentration of the feedstock. The pressure in the reactor can be autogeneous (i.e., the vapor pressure of water at the temperature of the reactor), can be hydraulic (i.e., the pressure caused by the pumping of a fluid against a restriction), or can result from the addition of an inert gas such as nitrogen or argon. Suitable batch hydrothermal reactors are available, for example, from Parr Instruments Co. (Moline, Ill.). Suitable continuous hydrothermal reactors are described, for example, in U.S. Pat. Nos. 5,453,262 (Dawson et al.) and 5,652,192 (Matson et al.); Adschiri et al., *J. Am. Ceram. Soc.* 75, 1019-1022 (1992); and Dawson, *Ceramic Bulletin,* 67 (10), 1673-1678 (1988).

In some methods, at least one of the hydrothermal treatments is in a continuous reactor. For example, the first hydrothermal treatment can be in a continuous reactor while the second hydrothermal treatment is in a batch reactor. In another example, the first hydrothermal treatment can be in a batch reactor while the second hydrothermal treatment is in a continuous reactor. In still another example, both the first and second hydrothermal treatments are in a continuous reactor.

The first hydrothermal treatment can be in a batch reactor at a temperature in the range of 150° C. to 300° C., in the range of 155° C. to 250° C., or in the range of 160° C. to 200° C. In some first hydrothermal treatments in a batch reactor, the reactor is heated to the desired temperature and then cooled immediately. It may take, for example, about 1 hour to reach the desired temperature. In other first hydrothermal treatments in a batch reactor, the reaction temperature is held for at least 0.5 hours, at least 0.75 hours, at least 1 hour, or at least 2 hours. The time at the reaction temperature can be up to 3 hours, up to 3.5 hours, up to 4 hours, up to 5 hours, up to 6 hours, or up to 8 hours in a batch reactor. For example, the time the reaction temperature is held can be 0.25 to 8 hours, 0.5 to 6 hours, or 0.75 to 3.5 hours.

Alternatively, the first hydrothermal treatment can be in a continuous reactor at a temperature in the range of 150° C. to 300° C., in the range of 160° C. to 250° C., in the range of 170° C. to 220° C., or in the range of 180° C. to 215° C. for a period of at least 1 minute. In some continuous reactors, the residence time is at least 2 minutes, at least 3 minutes, at least 3.5 minutes, or at least 4 minutes. The residence time can be up to 8 minutes, up to 10 minutes, up to 12 minutes, up to 15 minutes, or up to 20 minutes in a continuous reactor. For example, the residence time in a continuous reactor can be 1 to 20 minutes, 2 to 15 minutes, or 3 to 10 minutes.

The zirconium salts and optional yttrium salts in the first feedstock undergo only partial hydrolysis during the first hydrothermal treatment. The product of the first hydrothermal treatment includes a zirconium-containing intermediate plus various byproducts in a liquid phase. If an optional yttrium salt is included in the first feedstock, the zirconium-containing intermediate also contains yttrium. The zirconium-containing intermediate is only partially hydrolyzed and is not crystalline zirconia. The zirconium-containing intermediate is essentially amorphous based on x-ray diffraction analysis. That is, the x-ray diffraction pattern for the zirconium-containing intermediate tends to have broad peaks rather than the relatively narrow peaks indicative of crystalline material.

The percent conversion (i.e., the extent of hydrolysis) can be calculated, for example, using Thermal Gravimetric Analysis (TGA). This method of calculating the percent conversion is particularly suitable when the carboxylate anions in the first feedstock are free of polyether carboxylates, free of carboxylates having more than four carbon atoms, or combinations thereof. The percent conversion of the zirconium-containing intermediate can be given by the following equation $$\% \text{ Conversion} = 100(A-B)/(A-C)$$

where A is the percent weight loss of the first feedstock, B is the percent weight loss of the zirconium-containing intermediate, and C is the percent weight loss of the zirconia sol. The percent weight loss for the first feedstock, the intermediate, and the zirconia sol is determined by drying each sample at 120° C. for 30 minutes before analysis. After equilibration at 85° C. in the thermal gravimetric analyzer, each sample is heated at a rate of 20° C./minute to 200° C. The temperature is held at 200° C. for 20 minutes, increased at a rate of 20° C./minute to 900° C., and held at 900° C. for 20 minutes. The percent weight loss can be calculated from the following equation $$\% \text{ weight loss} = 100(\text{weight}_{200C} - \text{weight}_{900C})/\text{weight}_{900C}$$

for the first feedstock, the zirconium-containing intermediate, and the zirconia sol. The percent weight loss corresponds to what is not an inorganic oxide in each of the dried samples.

The percent conversion of the zirconium-containing intermediate is typically 40 to 75 percent. In some methods, the percent conversion of the zirconium-containing intermediate is 45 to 70 percent, 50 to 70 percent, 55 to 70 percent, or 55 to 65 percent. The percent conversion can be used to select suitable conditions for the first hydrothermal treatment.

If the hydrolysis reaction during the first hydrothermal treatment is allowed to proceed to produce a zirconium-containing intermediate with a percent conversion greater than about 75 percent, the final zirconia sol tends to contain associated (e.g., aggregated and/or agglomerated) rather than non-associated primary particles of zirconia. Although not wanting to be bound by theory, it is advantageous to remove at least a portion of the byproducts of the hydrolysis reaction during the course of the reaction. Thus, it is advantageous to subject the first feedstock to a first hydrothermal treatment and remove a portion of the byproduct prior to the second hydrothermal treatment.

The second feedstock, the material that is subjected to the second hydrothermal treatment, is prepared from the product of the first hydrothermal treatment. The preparation of the second feedstock usually involves removing at least some of the byproducts that are produced during the first hydrothermal treatment. An acid, which can be formed from the anion of the zirconium salt and the optional yttrium salt, is often one of the byproducts of the first hydrothermal treatment. When the acidic byproduct is a carboxylic acid having no more than four carbon atoms, the acid can be removed by a variety of methods such as vaporization, dialysis, ion exchange, precipitation, filtration, and the like.

The removal of at least some of the byproducts of the first hydrothermal treatment also can result in the removal of at least some of the liquid phase (e.g., aqueous medium). That is, an intermediate concentrate can be formed. In some embodiments, only a portion of the liquid phase is removed (i.e., the intermediate concentrate has a liquid phase). For example, some products of the first hydrothermal treatment contain a solid phase that can be separated from part of the liquid phase (e.g., the solid phase can settle out of the liquid phase). At least a portion of the liquid phase can be removed by methods such as by siphoning, decantation, or centrifugation. In other embodiments, the product of the first hydrothermal treatment is dried to form a residue (i.e., the intermediate concentrate has little or no liquid phase). The solids of the intermediate concentrate are often in the range of 10 to 100 weight percent.

The intermediate concentrate typically contains at least 5 weight percent zirconium, at least 8 weight percent zirconium, at least 10 weight percent zirconium, at least 20 weight percent zirconium, or at least 30 weight zirconium. The intermediate concentrate can contain up to 30 weight percent zirconium, up to 40 weight percent zirconium, up to 50 weight percent zirconium, or up to 52 weight percent zirconium. For example, the intermediate concentrate can contain 5 to 52 weight percent zirconium or 8 to 52 weight percent zirconium.

The intermediate concentrate, if the solids are no greater than 50 weight percent, can be used as the second feedstock. Alternatively, the intermediate concentrate can be diluted with water (e.g., deionized water) to form the second feedstock. The second feedstock often contains 0.5 to 50 weight percent solids or 3 to 40 weight percent solids when the second hydrothermal reactor is a batch reactor. The second feedstock often contains 0.5 to 25 weight percent solids or 7 to 22 weight percent solids when the second hydrothermal reactor is a continuous reactor.

The second feedstock typically contains at least 0.3 weight percent zirconium. When the second reactor is a batch reactor, the second feedstock often contains at least 0.5 weight percent zirconium, at least 1 weight percent zirconium, or at least 2 weight percent zirconium. The second feedstock for a batch reactor can contain up to 15 weight percent zirconium, up to 20 weight percent zirconium, up to 21 weight percent zirconium, up to 25 weight percent zirconium, or up to 26 weight percent zirconium. For example, the second feedstock for a batch reactor can contain 0.3 to 26 weight percent zirconium or 2 to 21 weight percent zirconium. When the second reactor is a continuous reactor, the second feedstock often contains at least 1 weight percent zirconium, at least 2 weight percent zirconium, at least 4 weight percent zirconium, or at least 8 weight percent zirconium. The second feedstock for a continuous reactor often contains up to 11 weight percent zirconium, up to 12 weight percent zirconium, or up to 13 weight percent zirconium. For example, the second feedstock for a continuous reactor can contain 0.3 to 13 weight percent zirconium or 8 to 11 weight percent zirconium.

The pH of the second feedstock is typically less than 7. For example, the second feedstock can have a pH that is no greater than 6 or no greater than 5.

The second feedstock is subjected to a second hydrothermal treatment to form a zirconia sol. If a batch reactor is used for the second hydrothermal treatment, the reaction temperature is often in the range of 150° C. to 300° C., in the range of 160° C. to 250° C., or in the range of 175° C. to 200° C. for a period of at least 30 minutes. In some batch reactors, the residence time is at least 1 hour, at least 2 hours, or at least 4 hours. The residence time can be up to 8 hours, up to 10 hours, up to 12 hours, up to 14 hours, up to 16 hours, up to 18 hours, or up to 24 hours in a batch reactor. For example, the residence time in a batch reactor can be 0.5 to 24 hours, 1 to 18 hours, or 1 to 14 hours. Alternatively, the second hydrothermal treatment can be in a continuous reactor at a temperature in the range of 150° C. to 300° C., in the range of 160° C. to 250° C., in the range of 180° C. to 220° C., or in the range of 200° C. to 215° C. for a period of at least 1 minute. In some continuous reactors, the residence time is at least 1 minutes, at least 2 minutes, at least 5 minutes, or at least 10 minutes. The residence time can be up to 60 minutes, up to 80 minutes, up to 90 minutes, up to 100 minutes, or up to 120 minutes in a continuous reactor. For example, the residence time in a continuous reactor can be 1 to 120 minutes, 5 to 100 minutes, or 10 to 90 minutes.

During the second hydrothermal treatment, the zirconium-containing intermediate undergoes further hydrolysis. The product of the second hydrothermal treatment is a zirconia sol that contains crystalline zirconia particles. The zirconia sol can be dried at a temperature of 120° C. to provide zirconia particles that typically contains 75 to 95 weight percent inorganic oxides. The zirconia particles can contain yttrium oxide (i.e., $Y_2O_3$) in addition to zirconia (i.e., Zirconia). The zirconia particles can also contain some organic material.

In some embodiments, the zirconia sol is further treated to at least partially remove the byproducts formed during the second hydrothermal treatment. The byproducts are often acids formed from the anion of the zirconium salt or the optional yttrium salt. It is often desirable to remove the acidic byproduct if the zirconia particles in the zirconia sol will be combined with an organic matrix to form a composite material. For example, the acidic byproduct can be a carboxylic acid that can be removed by vaporization, ion exchange, precipitation, or dialysis. The zirconia sol often contains 0.5 to 55 weight percent solids or 2 to 51 weight percent solids.

The zirconia sol typically contains at least 0.3 weight percent zirconium. For example, the zirconia sol can contain at least 1 weight percent zirconium, at least 2 weight percent zirconium, at least 5 weight percent zirconium, or at least 10 weight percent zirconium. The zirconia sol often contains up to 34 weight percent zirconium, up to 35 weight percent zirconium, or up to 37 weight percent zirconium. For example, the zirconia sol can contain 0.3 to 37 weight percent zirconia, 0.5 to 35 weight percent zirconium, or 1 to 34 weight percent zirconium.

The method of preparing the zirconia sol includes at least two hydrothermal treatments. In some embodiments, more than two hydrothermal treatments are used. Between each hydrothermal treatment, at least some of the acidic byproducts formed in the preceding hydrothermal treatment can be removed.

After preparing the zirconia sol in which the zirconia particles are dispersed in an aqueous phase, the zirconia particles are surface-modified. The surface modification includes adding a surface modifier to form surface-modified zirconia particles. In some methods of preparing the surface-modified zirconia particles, at least some of the aqueous phase can be removed before or after addition of the surface modifying agent. The surface-modified zirconia particles are combined with an organic matrix to form a coating composition. In some methods, at least some of the aqueous phase can be removed before or after the addition of the organic matrix.

Generally, the surface modification may be accomplished by simple addition of a surface modifying agent to a zirconia sol. Optionally, a water miscible cosolvent may be used to increase the solubility of the surface modifying agent and/or compatibility of the surface-modified zirconia particles in the aqueous phase. Suitable cosolvents include water-miscible organic compounds such as, for example, 1-methoxy-2-propanol, ethanol, isopropanol, ethylene glycol, N,N-dimethylacetamide, N-methylpyrrolidone, or the like. The cosolvents can enhance the solubility of the surface modifying agent as well as the solubility of the surface-modified particles.

The surface modification reactions can occur at room temperature (e.g., 20° C. to 25° C.) or at elevated temperatures (e.g., up to about 95° C.). When the surface modification agents are acids such as carboxylic acids, the zirconia particles typically can often be surface-modified at room temperature. When the surface modification agents are silanes, the zirconia particles are typically surface-modified at elevated temperatures.

The surface modification reactions can be under acidic or basic conditions depending on the particular surface modifying agent. For example, silanes can be heated with the zirconia sol under acidic conditions. A base such as aqueous ammonia can be added to precipitate the zirconia particles. The precipitated zirconia particles with attached surface modifying agents can be separated (e.g., filtered) from the liquid phase. The separated zirconia particles can then be dispersed in a water miscible solvent.

Various methods may be used to combine the zirconia sol of the present invention with an organic matrix material to form a coating composition. In one embodiment, a solvent exchange procedure may be utilized. In the solvent exchange procedure, the zirconia particles in the zirconia sol are surface-modified and the organic matrix material is first added to the surface-modified zirconia sol. Optionally, prior to addition of the organic matrix material, a co-solvent such as 1-methoxy-2-propanol or N-methyl pyrrolidone may be added to the zirconia sol to improve miscibility of the organic matrix material in the water. After addition of the organic matrix material, the water and optional co-solvent can be removed by evaporation, leaving the zirconia particles dispersed in the organic matrix material. Suitable evaporation methods include, for example, distillation, rotary evaporation, oven drying, and the like.

Alternatively, another method for preparing a coating composition includes drying of the zirconia sol to produce a powder of zirconia particles and then dispersing the zirconia particles in an organic matrix. The zirconia particles in the sol can be surface-modified before drying or can be surface-modified in the presence of the organic matrix. The zirconia sol can be dried to a powder using conventional means such as oven drying or spray drying. For example, the zirconia sol can be dried in a conventional oven at a temperature of at least 70° C. Some zirconia sols can be dried at a temperature of 70° C. to 90° C. for about 2 to 4 hours.

In yet another method of preparing a coating composition, the zirconia particles in the zirconia sol are surface-modified with a non-polar carboxylic acid such as, for example, oleic acid. The non-polar acid surface modifies the zirconia particles causing them to flock into a filterable mass. The surface-modified zirconia particles may then be separated from the liquid phase of the zirconia sol by filtration, optionally dried, and combined with the organic matrix material to form a coating composition.

In still another method of preparing a coating composition, the zirconia particles in the zirconia sol are surface-modified with a surface modifier having a non-polar B group. The surface-modified zirconia particles can be extracted into a water immiscible solvent or monomer, for example, toluene, hexane, ethyl acetate, styrene, or the like. The extracted surface-modified zirconia particles can then be combined with oligomeric, monomeric, or polymeric material.

The coating compositions include surface-modified zirconia particles and a polymerizable composition. Suitable polymerizable compositions are those described above. The polymerizable compositions can contain a solvent or can be free of a solvent. The coating composition is then contacted with a micro-replication tool having a plurality of ridges (i.e., the surface of the micro-replication tool is microstructured). The coating composition is polymerized to form an optical layer having a microstructured surface.

The microstructured surface of the optical layer of the brightness enhancement film can be constructed in a variety of forms, including those having a series of alternating tips and grooves sufficient to produce a totally internal reflecting film. An example of such a microstructured surface is one having a regular repeating pattern of symmetrical tips and grooves. Other microstructured surfaces have patterns in which the tips and grooves are not symmetrical. Examples of suitable microstructures for brightness enhancement films are further described in U.S. Pat. Nos. 5,175,030 (Lu et al.), 5,183,597 (Lu), 5,771,328 (Wortman et al.), 5,917,664 (O'Neill et al), 5,919,551 (Cobb, Jr. et al.), 6,111,696 (Allen et al.), 6,280,063 B1 (Fong et al.), 6,356,39 B1 (Gardiner et al.), the disclosures of which are incorporated herein by reference.

A microstructured optical layer can be prepared, for example, by a method including the steps of (a) preparing a polymerizable composition; (b) depositing the polymerizable composition onto a micro-replication tool, which is a negative microstructured shaping surface, in an amount barely sufficient to fill the cavities of the micro-replication tool; (c) filling the cavities by moving a bead of the polymerizable composition between a preformed base and the micro-replication tool, at least one of which is flexible; and (d) curing the composition. The micro-replication tool can be metallic, such as nickel, nickel-plated copper or brass, or can be a thermoplastic material that is stable under polymerization conditions and that preferably has a surface energy that permits clean removal of the polymerized material from the micro-replication tool. The particular method used to create the microstructure topography described herein can be similar to the process described in U.S. Pat. No. 5,691,846 which is incorporated by reference herein. The microstructured article can be formed from a continuous process at any desired length such as, for example, 5, 10, 100, 1000 meters or more.

A second method of making a light management film includes providing a zirconia sol that contains zirconia particles dispersed in an aqueous phase, modifying the surface of the zirconia particles to form surface-modified zirconia particles, preparing a coating composition that contains the surface-modified zirconia particles and an organic matrix, contacting the coating composition with a micro-replication tool, and polymerizing the coating composition to form an optical layer having a microstructured surface. The zirconia sol, before surface modification of the zirconia particles, includes a carboxylic acid that contains no greater than four carbon atoms and that is substantially free of a polyether carboxylic acid. The zirconia particles have an average primary particle size no greater than 50 nanometers, a dispersion index of 1 to 5, a ratio of intensity-average particle size to volume-average particle size no greater than 3.0, and a crystal structure that is at least 50 percent cubic, tetragonal, or a combination thereof. In some embodiments of the zirconia sol, the zirconia particles contain 0.1 to 8 weight percent yttrium based on the weight of the inorganic oxides in the zirconia particles and have a crystal structure that is at least 70 percent cubic, tetragonal, or a combination thereof.

For this method, the zirconia particles can be surface-modified and the coating compositions can be prepared as described above. Additionally, the microstructured surface can be formed, as described above, by contacting the coating composition with a micro-replication tool and polymerizing the coating composition. The resulting light management film can be, for example, a brightness enhancement film, a reflective film, a turning film, or the like.

Figure 2:
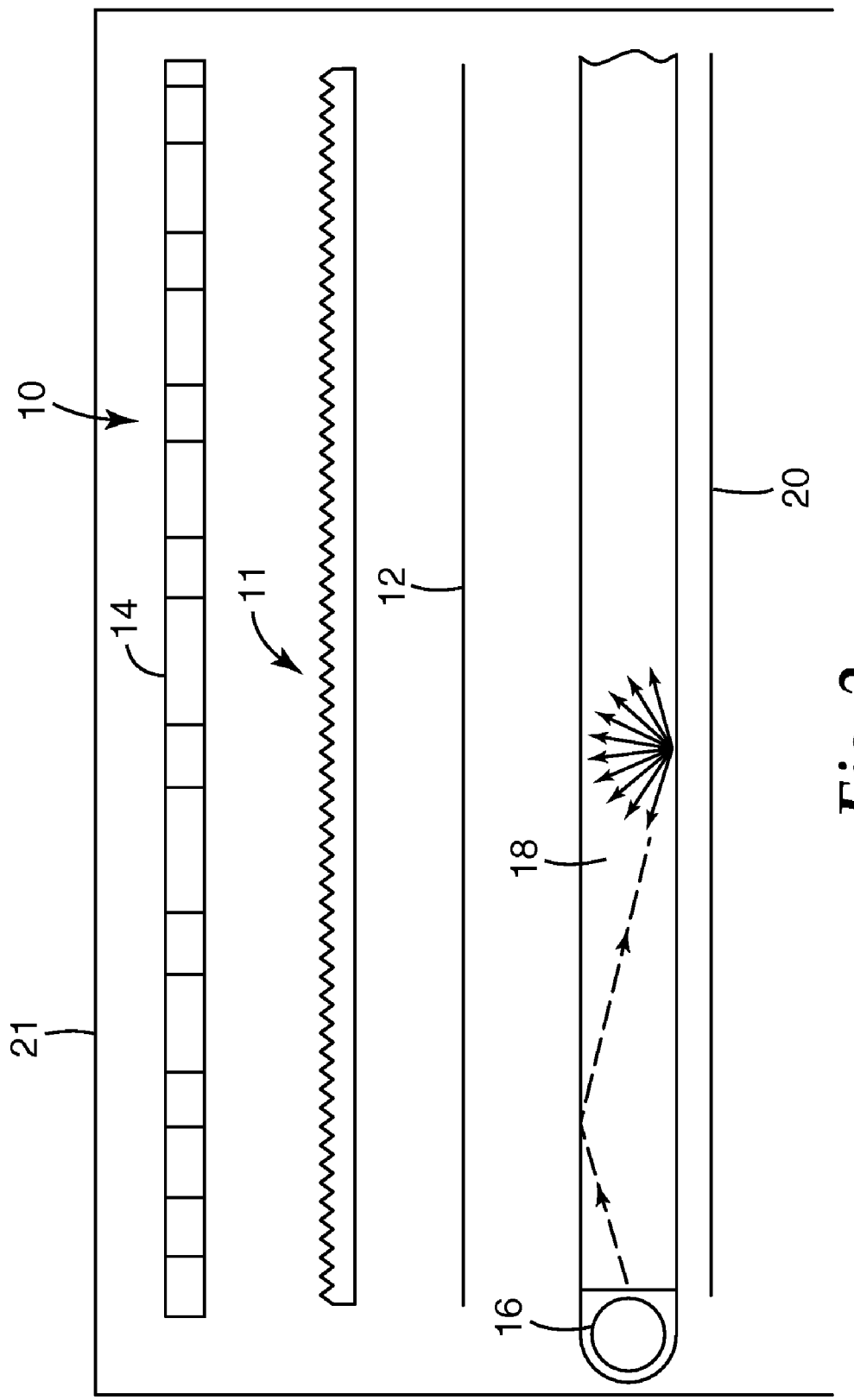
FIG. 2 is a schematic view of an illustrative microstructured light management film on a backlit liquid crystal display.

The light management films can be using in combination with a display such as a liquid crystal display panel. A backlit liquid crystal display generally indicated at 10 in FIG. 2 includes a light management film 11 (e.g., brightness enhancement film) that can be positioned between a diffuser 12 and a liquid crystal display panel 14. The backlit liquid crystal display can also includes a light source 16 such as a fluorescent lamp, a light guide 18 for transporting light for reflection toward the liquid crystal display panel 14, and a white reflector 20 for reflecting light also toward the liquid crystal display panel. The light management film 11 collimates light emitted from the light guide 18 thereby increasing the brightness of the liquid crystal display panel 14. The increased brightness enables a sharper image to be produced by the liquid crystal display panel and allows the power of the light source 16 to be reduced to produce a selected brightness. The light management film 11 in the backlit liquid crystal display is useful in equipment such as computer displays (laptop displays and computer monitors), televisions, video recorders, mobile communication devices, handheld devices (e.g. cellphones and Personal Digital Assistants (PDA)), automobile and avionic instrument displays, and the like, represented by reference character 21.

Figure 3:
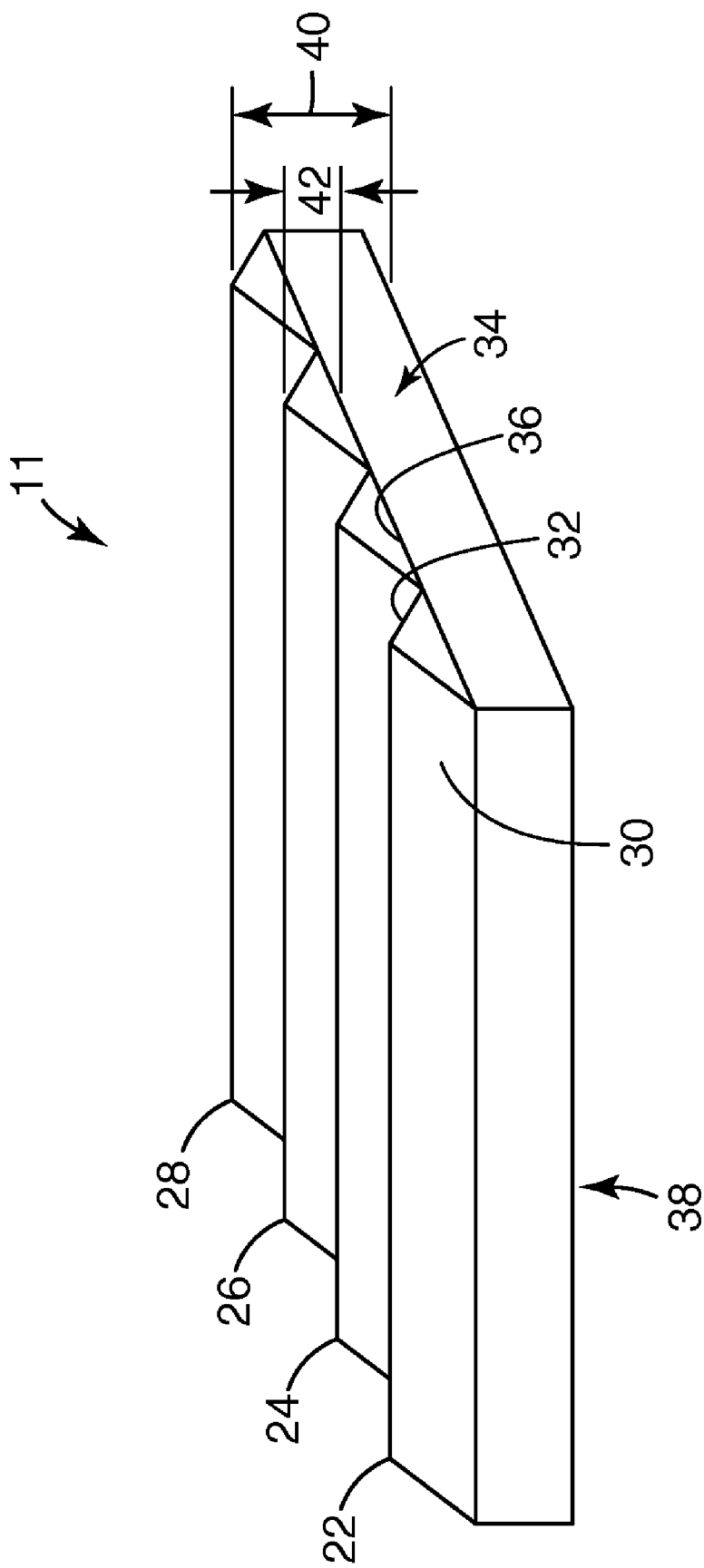
FIG. 3 is a perspective view of an illustrative microstructured light management film.

The light management film 11 includes an array of prisms typified by prisms 22, 24, 26, and 28, as illustrated in FIG. 3. Each prism, for example, such as prism 22, has a first facet 30 and a second facet 32. The prisms 22, 24, 26, and 28 can be formed on a body portion 34 that has a first surface 36 on which the prisms are formed and a second surface 38 that is substantially flat or planar and opposite the first surface.

A linear array of regular right prisms can provide both optical performance and ease of manufacture. By right prisms, it is meant that the apex angle θ is approximately 90°, but can also range from approximately 70° to 120° or from approximately 80° to 100°. The prism facets need not be identical, and the prisms may be tilted with respect to each other. Furthermore, the relationship between the thickness 40 of the film and the height 42 of the prisms is not critical, but it is desirable to use thinner films with well defined prism facets. The angle that the facets can form with the surface 38 if the facets were to be projected can be 45°. However, this angle would vary depending on the pitch of the facet or the angle θ of the apex.

FIGS. 4 to 10 illustrate representative embodiments of constructions for light management films (e.g., brightness enhancement films). It should be noted that these drawings are not to scale and that, in particular, the size of the structured surface is greatly exaggerated for illustrative purposes. The construction of the light management film can include combinations or two or more of the described embodiments below.

Figure 4:
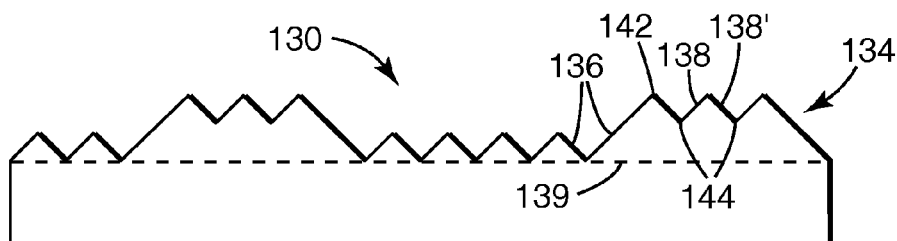
FIG. 4 is a cross-sectional view of an illustrative microstructured light management film that has prism elements of varying height.

Referring to FIG. 4, there is illustrated a representative cross-section of a portion of one embodiment of a light management film. The light management film 130 (e.g., brightness enhancement film) includes a first surface 132 and an opposing structured surface 134 that includes a plurality of substantially linearly extending prism elements 136. Each prism element 136 has a first side surface 138 and a second side surface 138', the top edges of which intersect to define the peak, or apex 142 of the prism element 136. The bottom edges of side surfaces 138, 138' of adjacent prism elements 136 intersect to form a linearly extending groove 144 between prism elements. In the embodiment illustrated in FIG. 4, the dihedral angle defined by the prism apex 142 measures approximately 90 degrees, however it will be appreciated that the exact measure of the dihedral angle in this and other embodiments may be varied in accordance with desired optical parameters.

The structured surface 134 of light management film 130 may be described as having a plurality of alternating zones of prism elements having peaks that are spaced at different distances from a common reference plane. The common reference plane may be arbitrarily selected. One convenient example of a common reference plane is the plane which contains first surface 132; another is the plane defined by the bottom of the lower most grooves of the structured surface, indicated by dashed line 139. In the embodiment illustrated in FIG. 4, the shorter prism elements measure approximately 50 micrometers in width and approximately 25 micrometers in height, measured from dashed line 139, while the taller prism elements measure approximately 50 micrometers in width and approximately 26 micrometers in height. The width of the zone that includes the taller prism elements can measure between about 1 micron and 300 micrometers. The width of the zone that includes the shorter prism elements is not critical and can measures between 200 micrometers and 4000 micrometers. In any given embodiment the zone of shorter prism elements can be at least as wide as the zone of taller prism elements. It will be appreciated by one of ordinary skill in the art that the optical layer depicted in FIG. 4 is merely exemplary and is not intended to limit the scope of the present invention. For example, the height or width of the prism elements may be changed within practicable limits (e.g., it is practicable to machine precise prisms in ranges extending from about 1 micron to about 200 micrometers). Additionally, the dihedral angles may be changed or the prism axis may be tilted to achieve a desired optical effect.

The width of the first zone can be less than about 200 to 300 micrometers. Under normal viewing conditions, the human eye has difficulty resolving small variations in the intensity of light that occur in regions less than about 200 to 300 micrometers in width. Thus, when the width of the first zone is reduced to less than about 200 to 300 micrometers, any optical coupling that may occur in this zone is not detectable to the human eye under normal viewing conditions.

A variable height structured surface may also be implemented by varying the height of one or more prism elements along its linear extent to create alternating zones which include portions of prism elements having peaks disposed at varying heights above a common reference plane.

Figure 5:
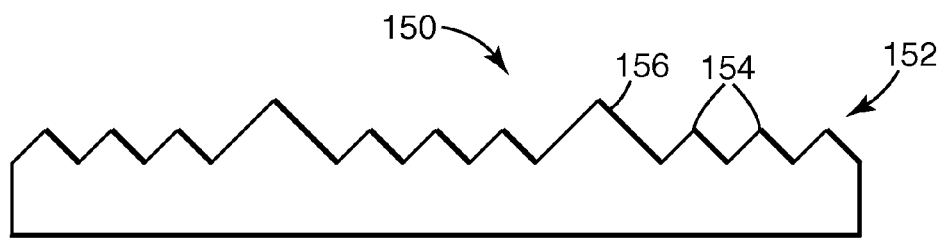
FIG. 5 is a cross-sectional view of an illustrative microstructured light management film that has prism elements of varying height.

FIG. 5 illustrates another embodiment of a light management film similar to FIG. 4 except that the light management film 150 (e.g., a brightness enhancement film) includes a structured surface 152 which has a zone of relatively shorter prism elements 154 separated by a zone including a single taller prism element 156. Much like the embodiment depicted in FIG. 4, the taller prism element limits the physical proximity of a second sheet of film to structured surface 152, thereby reducing the likelihood of a visible wet-out condition. It has been determined that the human eye is sensitive to changes in facet heights in light directing films and that relatively wide zones of taller prism elements will appear as visible lines on the surface of a film. While this does not materially affect the optical performance of the film, the lines may be undesirable in certain commercial circumstances. Reducing the width of a zone of taller prism elements correspondingly reduces the ability of a human eye to detect the lines in the film caused by the taller prism elements.

Figure 6:
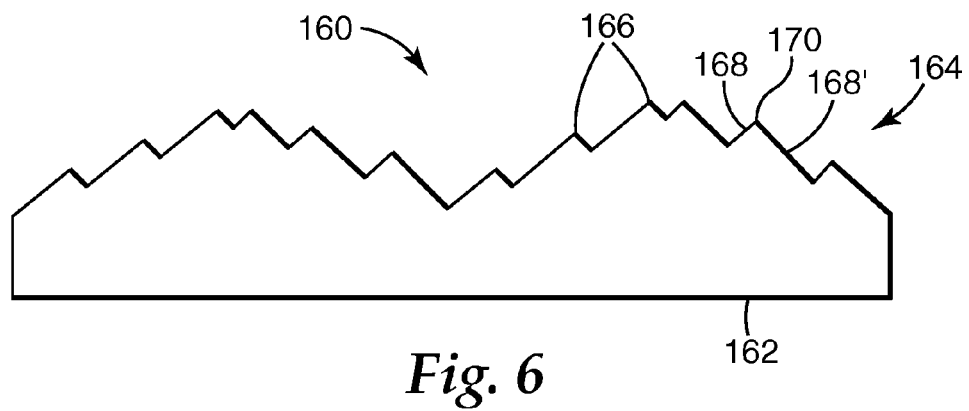
FIG. 6 is a cross-sectional view of an illustrative microstructured light management film.

FIG. 6 is a representative example of another embodiment of a light management film (e.g., brightness enhancement film) in which the prism elements are approximately the same size but are arranged in a repeating stair step or ramp pattern. The light management film 160 depicted in FIG. 6 includes a first surface 162 and an opposing structured surface 164 including a plurality of substantially linear prism elements 166. Each prism element has opposing lateral faces 168, 168' that intersect at their upper edge to define the prism peaks 170. The dihedral angle defined by opposing lateral faces 168, 168' measures approximately 90 degrees. In this embodiment the highest prisms may be considered a first zone and adjacent prisms may be considered a second zone. Again, the first zone can measure less than about 200 to 300 micrometers.

Figure 7:
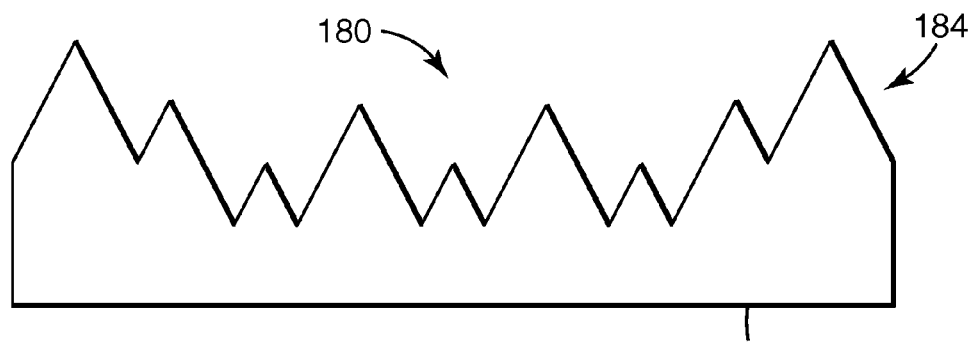
FIG. 7 is a cross-sectional view of an illustrative microstructured light management film in which the prism elements are of different heights and have their bases in different planes.

FIG. 7 illustrates a further embodiment of a light management film (e.g., brightness enhancement film). The light management film 180 disclosed in FIG. 7 includes a first surface 182 and an opposing structured surface 184. This light management film may be characterized in that the second zone that includes relatively shorter prism elements contains prism elements of varying height. The structured surface depicted in FIG. 7 has the additional advantage of substantially reducing the visibility to the human eye of lines on the surface of the optical layer caused by the variations in the height of the prism elements.

Figure 8:
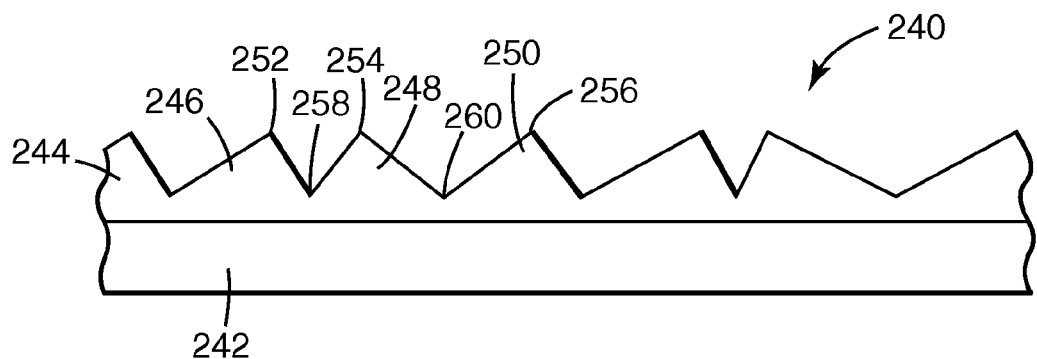
FIG. 8 is a cross-sectional view of an illustrative microstructured light management film.

FIG. 8 shows another embodiment of a light management film (e.g., brightness enhancement film) for providing a soft cutoff. FIG. 8 shows a light management film, designated generally as 240. Light management film 240 includes a base layer 242 and a microstructured optical layer 244. The exterior surface of base layer 242 is preferably flat, but could have structures as well. Furthermore, other alternative substrates could be used.

Microstructured optical layer 244 has a plurality of prisms such as prisms 246, 248, and 250, formed thereon. Prisms 246, 248, and 250 have peaks 252, 254, and 256, respectively. All of peaks 252, 254, and 256 have peak or prism angles of preferably 90 degrees, although included angles in the range 60 degrees to 120 degrees. Between prisms 246 and 248 is a valley 258. Between prisms 248 and 250 is a valley 260. Valley 258 may be considered to have the valley associated with prism 246 and has a valley angle of 70 degrees and valley 260 may be considered the valley associated with prism 248 and has a valley angle of 110 degrees, although other values could be used. Effectively, brightness enhancing film 240 increases the apparent on axis brightness of a backlight by reflecting and recycling some of the light and refracting the remainder like prior art brightness enhancing film, but with the prisms canted in alternating directions. The effect of canting the prisms is to increase the size of the output light cone.

Figure 9:
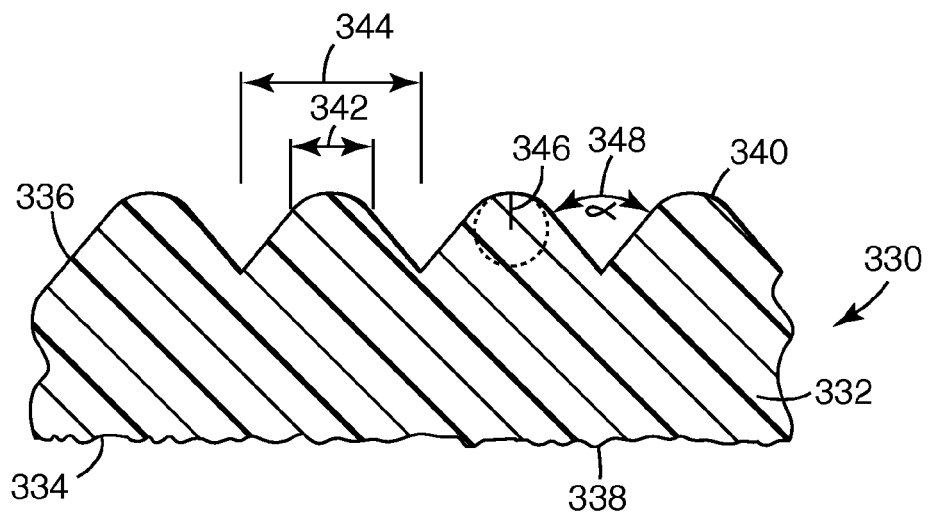
FIG. 9 is a cross-sectional view of an illustrative microstructured light management film.

FIG. 9 shows another embodiment of a light management film (e.g., brightness enhancement film) having rounded prism apexes. The light management film 330 features a flexible, base layer 332 integrally formed with the optical layer. The light management film has a pair of opposed surfaces 334, 336, both of which are integrally formed with base layer 332. Surface 334 features a series of protruding light-diffusing elements 338. These elements may be in the form of "bumps" in the surface made of the same material as layer 332. Surface 336 features an array of linear prisms having blunted or rounded peaks 340 integrally formed with base layer 332. These peaks are characterized by a chord width 342, cross-sectional pitch width 344, radius of curvature 346, and root angle 348 in which the chord width is equal to about 20-40% of the cross-sectional pitch width and the radius of curvature is equal to about 20-50% of the cross-sectional pitch width. The root angle ranges from about 70-110 degrees, or from about 85-95 degrees, with root angles of about 90 degrees being preferred. The placement of the prisms within the array is selected to maximize the desired optical performance.

Rounded prism apex microstructured articles (e.g., light management films) usually suffer from decreased gain. However, the addition of high refractive index surface-modified colloidal nanoparticles of the invention offsets the lost gain from the rounded prism apex microstructured articles.

Figure 10:
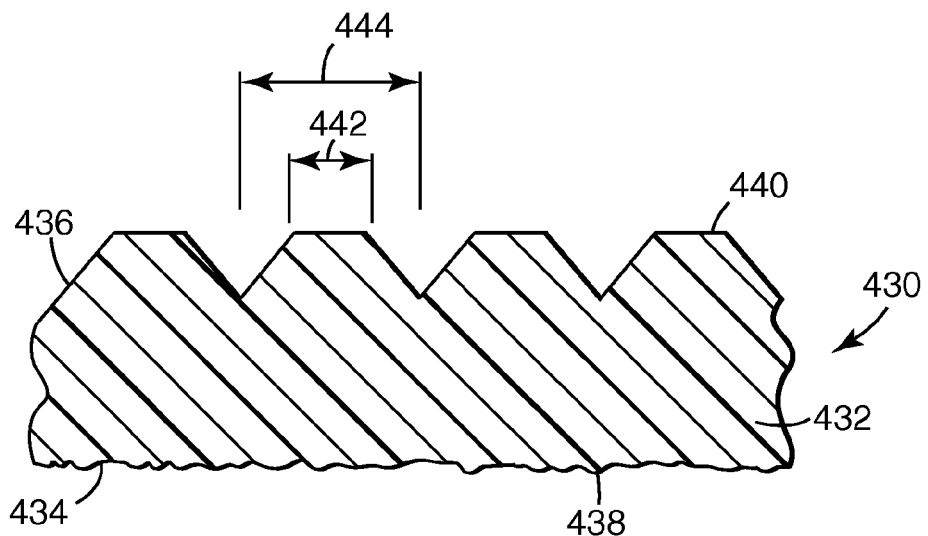
FIG. 10 is a cross-sectional view of an illustrative microstructured light management film.

FIG. 10 shows another embodiment of a light management film (e.g., brightness enhancement film) having flat or planar prism apexes. The light management film 430 features a flexible, base layer 432 integrally formed with the optical layer. The brightness enhancement film has a pair of opposed surfaces 434, 436, both of which are integrally formed with base layer 432. Surface 434 features a series of protruding light-diffusing elements 438. These elements may be in the form of "flat bumps" in the surface made of the same material as layer 432. Surface 436 features an array of linear prisms having flattened or planar peaks 440 integrally formed with base layer 432. These peaks are characterized by a flattened width 442 and cross-sectional pitch width 444, in which the flattened width can be equal to about 0-30% of the cross-sectional pitch width.

Another method of extracting light from a lightguide is by use of frustrated total internal reflection (TIR). In one type of frustrated TIR the lightguide has a wedge shape, and light rays incident on a thick edge of the lightguide are totally internally reflected until achieving critical angle relative to the top and bottom surfaces of the lightguide. These sub-critical angle light rays are then extracted, or more succinctly refract from the lightguide, at a glancing angle to the output surface. To be useful for illuminating a display device, these light rays must then be turned substantially parallel to a viewing, or output, axis of the display device. This turning is usually accomplished using a turning lens or turning film.

Figure 11:
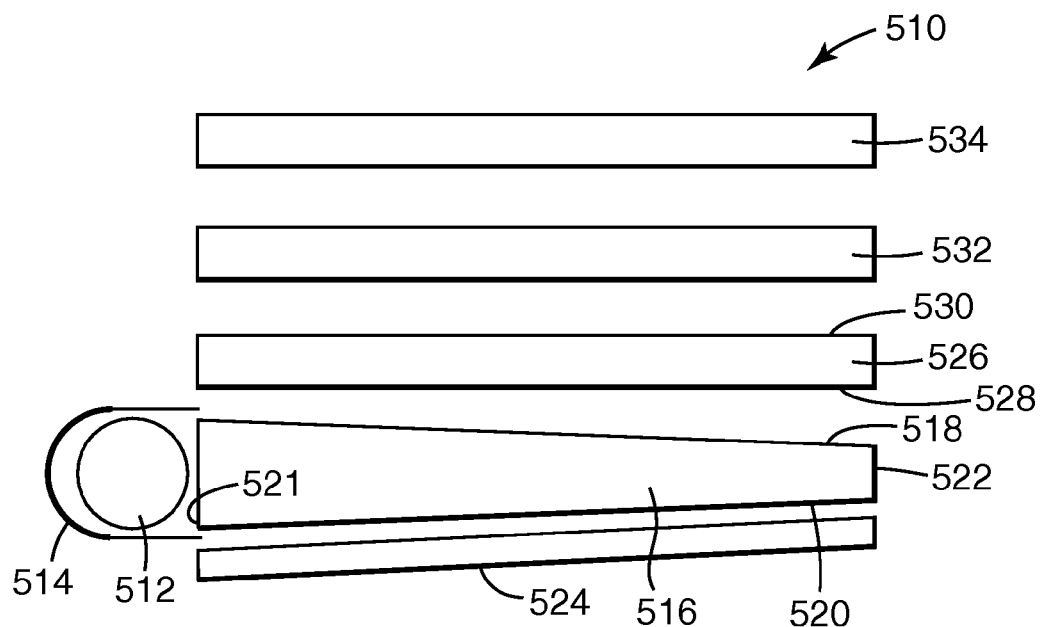
FIG. 11 is a schematic view of an illumination device including an illustrative turning film.
Figure 12:
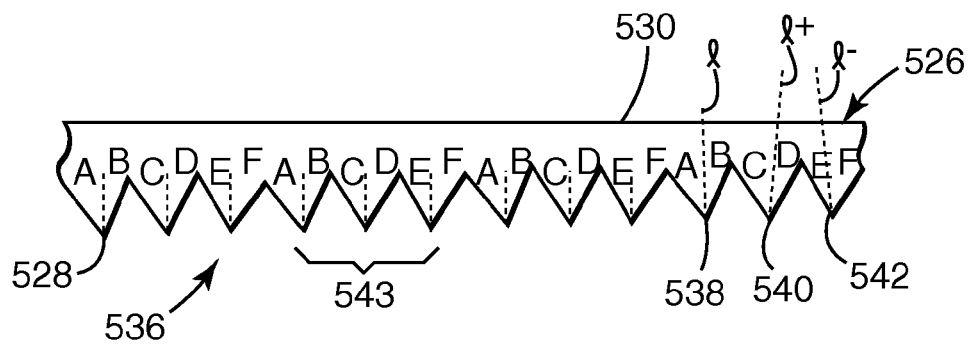
FIG. 12 is a cross-sectional view of an illustrative turning film.
Figure 13:
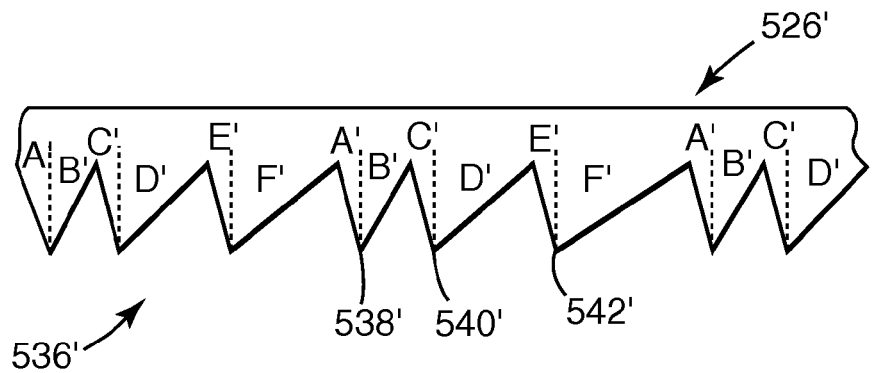
FIG. 13 is a cross-sectional view of another illustrative turning film.

FIGS. 11-13 illustrate an illumination device including a turning film. The turning film can include the inventive material disclosed herein for form a durable turning film. A turning lens or turning film typically includes prism structures formed on an input surface, and the input surface is disposed adjacent the lightguide. The light rays exiting the lightguide at the glancing angle, usually less than 30 degrees to the output surface, encounter the prism structures. The light rays are refracted by a first surface of the prism structures and are reflected by a second surface of the prism structures such that they are directed by the turning lens or film in the desired direction, e.g., substantially parallel to a viewing axis of the display.

Referring to FIG. 11, an illumination system 510 includes optically coupled a light source 512; a light source reflector 514; a lightguide 516 with an output surface 518, a back surface 520, an input surface 521 and an end surface 522; a reflector 524 adjacent the back surface 520; a first light redirecting element 526 with an input surface 528 and an output surface 530; a second light redirecting element 532; and a reflective polarizer 534. The lightguide 516 may be a wedge or a modification thereof. As is well known, the purpose of the lightguide is to provide for the uniform distribution of light from the light source 512 over an area much larger than the light source 512, and more particularly, substantially over an entire area formed by output surface 518. The lightguide 516 further preferably accomplishes these tasks in a compact, thin package.

The light source 512 may be a CCFL that is edge coupled to the input surface 521 of the lightguide 516, and the lamp reflector 514 may be a reflective film that wraps around the light source 512 forming a lamp cavity. The reflector 524 backs the lightguide 516 and may be an efficient back reflector, e.g., a lambertian or a specular film or a combination.

The edge-coupled light propagates from the input surface 521 toward the end surface 522, confined by TIR. The light is extracted from the lightguide 516 by frustration of the TIR. A ray confined within the lightguide 516 increases its angle of incidence relative to the plane of the top and bottom walls, due to the wedge angle, with each TIR bounce. Thus, the light eventually refracts out of each of the output surface 518 and the back surface 520 because it is no longer contained by TIR. The light refracting out of the back surface 520 is either specularly or diffusely reflected by the reflector 524 back toward and largely through the lightguide 516. The first light redirecting element 526 is arranged to redirect the light rays exiting the output surface 518 along a direction substantially parallel to a preferred viewing direction. The preferred viewing direction may be normal to the output surface 518, but will more typically be at some angle to the output surface 518.

As shown in FIG. 12, the first light redirecting element 526 is a light transmissive light management film where the output surface 530 is substantially planar and the input surface 528 is formed with an array 536 of prisms 538, 540 and 542. The second light redirecting element 532 may also be a light transmissive film, for example a brightness enhancing film such as the 3M Brightness Enhancement Film product (sold under the trade designation "BEFIII" from 3M Company, St. Paul, Minn.). The reflective polarizer 534 may be an inorganic, polymeric, cholesteric liquid crystal reflective polarizer or film. A suitable film is the 3M Diffuse Reflective Polarizer film product (sold under the trade designation "DRPF" from 3M Company) or the Specular Reflective Polarizer film product (sold under the trade designation "DBEF" from 3M Company).

Within array 536, each prism 538, 540 and 542 may be formed with differing side angles as compared to its respective neighbor prisms. That is, prism 540 may be formed with different side angles (angles C and D) than prism 538 (angles A and B), and prism 542 (angles E and F). As shown, prisms 538 have a prism angle, i.e., the included angle, equal to the sum of the angles A and B. Similarly, prisms 540 have a prism angle equal to the sum of the angles C and D, while prisms 542 have a prism angle equal to the sum of the angles E and F. While array 536 is shown to include three different prism structures based upon different prism angle, it should be appreciated that virtually any number of different prisms may be used.

Prisms 538, 540 and 542 may also be formed with a common prism angle but with a varied prism orientation. A prism axis "l" is illustrated in FIG. 12 for prism 538. The prism axis l may be arranged normal to the output surface 530, as shown for prism 538, or at an angle to the output surface either toward or away from the light source as illustrated by phantom axes "l+" and "l−", respectively, for prisms 540 and 542.

Prisms 538, 540 and 542 may be arranged within array 536 as shown in FIG. 12 in a regular repeating pattern or clusters 543 of prisms, and while the array 536 is not shown to have like prisms adjacent like prisms, such a configuration may also be used. Moreover, within the array 536, the prisms 538, 540 and 542 may change continuously from a first prism configuration, such as prism configuration 538, to a second prism configuration, such as prism configuration 540, and so on. For example, the prism configuration may change in a gradient manner from the first prism configuration to the second prism configuration. Alternatively, the prisms may change in a step-wise manner, similar to the configuration shown in FIG. 12. Within each cluster 543, the prisms have a prism pitch, which is selected to be smaller than the spatial ripple frequency. Likewise, the clusters may have a regular cluster pitch. The prism array can be symmetrical as shown in FIG. 12 or the prism array can be non-symmetrical.

While the array 536 shown in FIG. 12 has prisms having a symmetric configuration, an array of prisms, such as array 536' shown in FIG. 13 formed in light redirecting element 526', may be used. Referring then to FIG. 13, in the array 536', prisms 538', for example, has angle A' unequal to angle B'. Similarly for prisms 540' and 542', angle C' is unequal to angle A' and angle D', and angle E' is unequal to either of angle A', angle C' or angle F'. The array 536' may be advantageously formed using a single diamond cutting tool of a predetermined angle, and tilting the tool for each cut producing prisms of differing prism angle and symmetry. However, it will be appreciated that with the use of a single cutting tool, the prism angles will be the same, i.e., A+B=C+D=E+F.

It is contemplated that as few as two different prism configurations may be used and arranged in clusters within the array 536, although as many prism sizes as necessary to accomplish a modification of the output profile from the lightguide 516 may be used. One purpose of the prism side angle variation is to spread and add variable amounts of optical power into the first light redirecting element 526. The varying configuration of prisms 538, 540 and 542 serves to provide substantially uniform sampling of the input aperture of the lightguide, which minimizes non-uniformities in the light extracted from the lightguide 516. The net result is an effective minimization of the ripple effect particularly near the entrance end 521 of the lightguide 516.

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

EXAMPLES

Test Methods

Photon Correlation Spectroscopy (PCS)

The volume-average particle size was determined by Photon Correlation Spectroscopy (PCS) using a Malvern Series 4700 particle size analyzer (available from Malvern Instruments Inc., Southborough, Mass.). Dilute zirconia sol samples were filtered through a 0.2 µm filter using syringe-applied pressure into a glass cuvette that was then covered. Prior to starting data acquisition the temperature of the sample chamber was allowed to equilibrate at 25° C. The supplied software was used to do a CONTIN analysis with an angle of 90 degrees. CONTIN is a widely used mathematical method for analyzing general inverse transformation problems that is further described in S.W. Provencher, *Comput. Phys. Commun.* 27, 229 (1982). The analysis was performed using 24 data bins. The following values were used in the calculations: refractive index of water equal to 1.333, viscosity of water equal to 0.890 centipoise, and refractive index of the zirconia particles equal to 1.9.

Two particle size measurements were calculated based on the PCS data. The intensity-average particle size, reported in nanometers, was equal to the size of a particle corresponding to the mean value of the scattered light intensity distribution. The scattered light intensity was proportional to the sixth power of the particle diameter. The volume-average particle size, also reported in nanometers, was derived from a volume distribution that was calculated from the scattered light intensity distribution taking into account both the refractive index of the zirconia particles and the refractive index of the dispersing medium (i.e., water). The volume-average particle size was equal to the particle size corresponding to the mean of the volume distribution.

The intensity-average particle size was divided by the volume-average particle size to provide a ratio that is indicative of the particle size distribution.

Crystalline Structure and Size (XRD Analysis)

The particle size of a dried zirconia sample was reduced by hand grinding using an agate mortar and pestle. A liberal amount of the sample was applied by spatula to a glass microscope slide on which a section of double coated tape had been adhered. The sample was pressed into the adhesive on the tape by forcing the sample against the tape with the spatula blade. Excess sample was removed by scraping the sample area with the edge of the spatula blade, leaving a thin layer of particles adhered to the adhesive. Loosely adhered materials remaining after the scraping were remove by forcefully tapping the microscope slide against a hard surface. In a similar manner, corundum (Linde 1.0 μm alumina polishing powder, Lot Number C062, Union Carbide, Indianapolis, Ind.) was prepared and used to calibrate the diffractometer for instrumental broadening.

X-ray diffraction scans were obtained using a Philips vertical diffractometer having a reflection geometry, copper $K_\alpha$ radiation, and proportional detector registry of the scattered radiation. The diffractometer was fitted with variable incident beam slits, fixed diffracted beam slits, and graphite diffracted beam monochromator. The survey scan was conducted from 25 to 55 degrees two theta (2θ) using a 0.04 degree step size and 8 second dwell time. X-ray generator settings of 45 kV and 35 mA were employed. Data collections for the corundum standard were conducted on three separate areas of several individual corundum mounts. Data was collected on three separate areas of the thin layer sample mount.

The observed diffraction peaks were identified by comparison to the reference diffraction patterns contained within the International Center for Diffraction Data (ICDD) powder diffraction database (sets 1-47, ICDD, Newton Square, Pa.) and attributed to either cubic/tetragonal (C/T) or monoclinic (M) forms of zirconia. The (111) peak for the cubic phase and (101) peak for the tetragonal phase could not be separated so these phases were reported together. The amounts of each zirconia form were evaluated on a relative basis and the form of zirconia having the most intense diffraction peak was assigned the relative intensity value of 100. The strongest line of the remaining crystalline zirconia form was scaled relative to the most intense line and given a value between 1 and 100.

Peak widths for the observed diffraction maxima due to corundum were measured by profile fitting. The relationship between mean corundum peak widths and corundum peak position (2θ) was determined by fitting a polynomial to these data to produce a continuous function used to evaluate the instrumental breadth at any peak position within the corundum testing range. Peak widths for the observed diffraction maxima due to zirconia were measured by profile fitting observed diffraction peaks. The following peak widths were evaluated depending on the zirconia phase found to be present:

Cubic/Tetragonal (C/T): (1 1 1)
Monoclinic (M): (−1 1 1), and (1 1 1)

A Pearson VII peak shape model with $K_{\alpha 1}$ and $K_{\alpha 2}$ wavelength components accounted for, and linear background model were employed in all cases. Widths were found as the peak full width at half maximum (FWHM) having units of degrees. The profile fitting was accomplished by use of the capabilities of the JADE diffraction software suite. Sample peak widths were evaluated for the three separate data collections obtained for the same thin layer sample mount.

Sample peaks were corrected for instrumental broadening by interpolation of instrumental breadth values from corundum instrument calibration and corrected peak widths converted to units of radians. The Scherrer equation was used to calculate the primary crystal size.

$$\text{Crystallite Size }(D) = K\lambda/\beta(\cos\theta)$$

In the Scherrer equation,
  K=form factor (here 0.9);
  λ=wavelength (1.540598 Å);
  β=calculated peak width after correction for instrumental broadening (in radians)=[calculated peak FWHM−instrumental breadth] (converted to radians) where FWHM is full width at half maximum; and
  θ=½ the peak position (scattering angle).

The cubic/tetragonal crystallite size was measured as the average of three measurements using (1 1 1) peak.

$$\text{Cubic/Tetragonal Mean Crystallite Size} = [D(1\ 1\ 1)_{area\ 1} + D(1\ 1\ 1)_{area\ 2} + D(1\ 1\ 1)_{area\ 3}]/3$$

The monoclinic crystallite size was measured as the average of three measurement using the (−1 1 1) peak and three measurements using the (1 1 1) peak.

$$\text{Monoclinic Mean Crystallite Size} = [D(-1\ 1\ 1)_{area\ 1} + D(-1\ 1\ 1)_{area\ 2} + D(-1\ 1\ 1)_{area\ 3} + D(1\ 1\ 1)_{area\ 1} + D(1\ 1\ 1)_{area\ 2} + D(1\ 1\ 1)_{area\ 3}]/6$$

The weighted average of the cubic/tetragonal (C/T) and monoclininc phases (M) were calculated.

$$\text{Weighted average} = [(\%\ C/T)(C/T\ \text{size}) + (\%\ M)(M\ \text{size})]/100$$

In this equation,
  % C/T=the percent crystallinity contributed by the cubic and tetragonal crystallite content of the Zirconia particles;
  C/T size=the size of the cubic and tetragonal crystallites;
  % M=the percent crystallinity contributed by the monoclinic crystallite content of the Zirconia particles; and
  M size=the size of the monoclinic crystallites.

Dispersion Index

The Dispersion Index is equal to the volume-average size measured by PCS divided by the weighted average crystallite size measured by XRD.

Weight Percent Solids

The weight percent solids were determined by drying a sample weighing 3 to 6 grams at 120° C. for 30 minutes. The percent solids can be calculated from the weight of the wet sample (i.e., weight before drying, $\text{weight}_{wet}$) and the weight of the dry sample (i.e., weight after drying, $\text{weight}_{dry}$) using the following equation.

$$\text{wt-}\%\ \text{solids} = 100(\text{weight}_{dry})/\text{weight}_{wet}$$

Thermal Gravimetric Analysis (TGA)

The percent conversion of the zirconium-containing intermediate and the weight percent inorganic oxides were determined by thermal gravimetric analysis using a Model 2950 TGA from TA Instruments (New Castle, Del.).

To determine the percent conversion of the zirconium containing intermediate, a sample (e.g., 3 to 6 grams) was initially heated at 120° C. in an oven for 30 minutes to dry. The dried sample (e.g., 30 to 60 mg) was equilibrated at 85° C. in the TGA. The temperature was then increased at a rate of 20° C./minute to 200° C., held at 200° C. for 20 minutes, increased at 20° C./minute to 900° C., and held at 900° C. for 20 minutes. The organic material was volatilized between 200° C. and 900° C. leaving only the inorganic oxides such as $ZrO_2$ and $Y_2O_3$. The percent weight loss was calculated using the following equation.

% weight loss=$100$(%-weight$_{200C}$−%-weight$_{900C}$)/%-weight$_{900C}$

The %-weight$_{200C}$ was calculated from the weight of the sample at 200° C. (weight$_{200C}$) and from the weight of the dried sample (weight$_{dry}$) used for the analysis (e.g., sample dried at 120° C. before analysis).

%-weight$_{200C}$=$100$(weight$_{200C}$)/weight$_{dry}$

The %-weight$_{900C}$ is calculated from the weight of the sample at 900° C. (weight$_{900C}$) and from the weight of the dried sample (weight$_{dry}$) used for the analysis (e.g., sample dried at 120° C. before analysis.

%-weight$_{900C}$=$100$(weight$_{900C}$)/weight$_{dry}$

The percent conversion of the zirconium-containing intermediate is given by the following equation % Conversion=$100(A-B)/(A-C)$ where A is the percent weight loss of the first feedstock, B is the percent weight loss of the zirconium-containing intermediate, and C is the percent weight loss of the zirconia sol.

The weight percent inorganic oxide was calculated from the weight percent solids and the weight percent oxide at 900° C. That is, the weight percent inorganic oxide can be calculated using the following equation.

wt-% inorganic oxides=(wt-% solids)(%-weight$_{900C}$)/100

Index of Refraction

The refractive index was measured using an Abbe refractometer commercially available from Milton Roy Co. (Ivyland, Pa.).

Glossary

Unless otherwise noted, all chemical reagents were or can be obtained from Aldrich Chemical Co., Milwaukee, Wis.

As used herein,

"SR-351" or "TMPA" refers to trimethylolpropane triacrylate, obtained from Sartomer Co., Inc., Exton, Pa.;

"BR-31" refers to tribromophenoxyethyl acrylate, obtained from Dai-Ichi Kogyo Seiyaku Co., Ltd., Kyoto, Japan;

"SR-339" refers to phenoxyethyl acrylate, obtained from Sartomer Co., Inc., Exton, Pa.;

"SILQUEST A-174" refers to trimethoxysilylpropyl methacrylate, obtained from OSi Specialties North America, South Charleston, W. Va.;

"SILQUEST A-1230" refers to a proprietary silane obtained from OSi Specialties North America, South Charleston, W. Va.;

"SR-238" refers to hexanediol diacrylate, obtained from Sartomer, Co., Inc., Exton, Pa.;

"BCEA" refers to beta-carboxyethyl acrylate, obtained from Cytec Surface Specialties, Smyrna, Ga.;

"NOEA" refers to 1-naphthaloxyethyl acrylate, prepared as described in U.S. Pat. No. 6,541,591;

"NSEA" refers to 2-naphthalthioethyl acrylate, prepared as described in commonly assigned copending U.S. patent application Ser. No. 11/026,573;

"RDX-51027" refers to a tetrabromobisphenol A diacrylate, obtained from Surface Specialties, Inc., Smyrna, Ga.;

"MEEAA" refers to methoxyethoxyacetic acid, obtained from Aldrich Chemical Co., Milwaukee, Wis.;

"HDDA" refers to hexanediol diacrylate, obtained from Aldrich Chemical Co., Milwaukee, Wis.;

"TMPTA" refers to trimethylolpropane triacrylate;

"TPO-L" refers to ethyl 2,4,6-trimethylbenzoyldiphenylphosphinate, available under the trade designation "LUCIRIN TPO-L" from BASF Corp., Florham Park, N.J.; and "PROSTAB 5198" refers to a polymerization inhibitor obtained from Ciba Specialty Chemicals, Tarrytown, N.Y.

Preparation of Brightness Enhancement Films

The polymerizable resin compositions were prepared into brightness enhancement films using a micro-replication tool that had 90° apex angles as defined by the slope of the sides of the prisms.

In one set of experiments using the resins from Examples 1-5, 7, and 8, the mean distance between adjacent apexes was about 50 micrometers, the apexes of the prism were sharp, and the prisms varied in height along their length similar to that of a brightness enhancing film sold by 3M Company under the trade designation "VIKUITI BEF 11190/50 FILM". The polymerizable resin compositions were heated to a temperature of about 50° C. and poured onto the micro-replication tool in a sufficient volume to create a continuous film. A 5 mil polyethylene terephthalate film (PET) was placed in contact with the polymerizable resin. The PET, polymerizable resin, and the micro-replication tool were pulled under a coating bar device such that the polymerizable reins spread between the PET and the micro-replication tool. The coating bar was positioned relative to the micro-replication tool such that the thickness of the polymerizable resin was about 25 micrometers. After forming the polymerizable resin layer between the micro-replication tool and the PET film, the polymerizable resin layer was cured in an ultraviolet curing apparatus by exposing the polymerizable resin to about 3000 millijoules/cm2. After curing, the polymerized resin and PET film were peeled from the micro-replication tool.

In a second set of experiments using the resin from Example 4, the mean distance between adjacent apexes was about 24 micrometers ("HTBEF") and the apex of the prism vertices were sharp. The polymerizable resin compositions were heated to a temperature of about 50° C. and poured onto the micro-replication tool in a sufficient volume to create a continuous film. A 2 mil polyethylene terephthalate film (PET) was placed in contact with the polymerizable resin. The PET, polymerizable resin, and the micro-replication tool were pulled under a coating bar device such that the polymerizable reins spread between the PET and the micro-replication tool. The coating bar was positioned relative to the micro-replication tool such that the thickness of the polymerizable resin was about 13 micrometers. After forming the polymerizable resin layer between the micro-replication tool and the PET film, the polymerizable resin layer was cured in an ultraviolet curing apparatus by exposing the polymerizable resin to about 3000 millijoules/cm2. After curing, the polymerized resin and PET film were peeled from the micro-replication tool.

In a third set of experiments using the resin from Example 6 coated onto a brightness enhancement film (commercially available from 3M under the trade designation "VIKUITI DBEF-P") instead of PET film, the mean distance between adjacent apexes was about 24 micrometers and the apex of the prism vertices were sharp. The polymerizable resin compositions were heated to a temperature of about 50° C. and poured onto the micro-replication tool in a sufficient volume to create a continuous film. A VIKUITI DBEF-P film was placed in contact with the polymerizable resin. The VIKUITI DBEF-P film, polymerizable resin, and the micro-replication tool were pulled under a coating bar device such that the polymerizable reins spread between the VIKUITI DBEF-P film and the micro-replication tool. The coating bar was positioned relative to the micro-replication tool such that the thickness of the polymerizable resin was about 13 micrometers. After forming the polymerizable resin layer between the micro-replication tool and the VIKUITI DBEF-P film, the polymerizable resin layer was cured in an ultraviolet curing apparatus by exposing the polymerizable resin to about 3000 millijoules/cm2. After curing, the polymerized resin and VIKUITI DBEF-P film were peeled from the micro-replication tool.

The gain of the resulting brightness enhancing films was measured on a SpectraScan™ PR-650 SpectraColorimeter available from Photo Research, Inc, Chatsworth, Calif. The gain for the example brightness enhancement films are given in Table 1. The brightness enhancing film samples were cut and were placed on a Teflon light cube that was illuminated via a light-pipe using a Foster DCR II light source such that the grooves of the prisms were parallel to the front face of the Teflon light cube. A sheet of polarizing film was placed above the brightness enhancing film, such that the pass axis of the polarizing film was normal to the front face of the Teflon light cube. For some samples, a second sheet of the same brightness enhancing film was placed beneath the first sheet and orientated such that the grooves of the second sheet were normal to the front face of the Teflon light cube.

The configurations of the brightness enhancing films for the gain measurement are referred to as "HBEF III" (films made in the first set of experiments that are similar to a brightness enhancing film sold by 3M Company under the trade designation "VIKUITI BEF III90/50 FILM"), "HXBEF III" (a stack of two HBEF III films from the first set of experiments that are placed on the Teflon light cube such that the apex ridges of each film were orthogonal to the other film and the distance between adjacent apexes was 50 micrometers), "HTBEF" (films made in the second set of experiments in which the distance between adjacent apexes was 24 micrometers), "HXTBEF" (a stack of two HTBEF films from the second set of experiments in which the apex ridges of each film are orthogonal to those of the other film), "HDBEF" (films made in the third set of experiments in which the distance between adjacent apexes was 24 micrometers), "HDBEF/T-BEF" (a stack of two films, one made in the third set of experiments and the other film being commercially available under the trade designation "VIKUITI T-BEF" from 3M Company).

Preparative Example 1

Preparation of a Zirconia Sol 1

Yttrium acetate hydrate (38.58 g; obtained from Aldrich Chemical Co., Milwaukee, Wis.) was dissolved in zirconium acetate solution (1500.0 g; available from Nyacol Nano Technologies, Inc., Ashland, Mass.). The mixture was dried at room temperature overnight and was then further dried in a forced air oven at 90° C. for 4 hours. The resultant solid was dissolved in sufficient deionized water to give a 12.5 weight percent solution. This solution (i.e., the first feedstock) was pumped at a rate of 80 milliliters per minute through 100 feet of 0.25-inch outside-diameter stainless steel tubing that was immersed in an oil bath that was heated to 206° C. The flow then passed through an additional 40-foot length of tubing that was immersed in an ice water bath. A backpressure regulator was placed at the end of the tubing to maintain an exit pressure of 260 to 290 psig. The product of this step was a suspension of fine particles of a white solid. This liquid suspension was concentrated to 14.5 weight percent solids using a rotary evaporator. This concentrated suspension (i.e., the second feedstock) was pumped at a rate of 10 milliliters per minute through 100 feet of 0.25-inch outside diameter stainless steel tubing that was immersed in an oil bath that was heated to 206° C. The flow then passed through an additional 40-foot length of tubing that was immersed in an ice water bath. A backpressure regulator was placed at the end of the tubing to maintain an exit pressure of 260 to 270 psig. The product of this step was a sol (i.e., zirconia sol) that was determined to be 10.5 weight percent solids. The characterization data for this preparative example is in Tables 2 and 3.

Preparative Example 2

Preparation of a Zirconia Sol 2

Yttrium acetate hydrate (79.5 g; obtained from Aldrich Chemical Co., Milwaukee, Wis.) was dissolved in zirconium acetate solution (3000.0 g; available from Nyacol Nano Technologies, Inc., Ashland, Mass.). The mixture was dried at room temperature overnight and was then further dried in a forced air oven at 90° C. for 4 hours. The resultant solid was dissolved in sufficient deionized water to give a 12.5 weight percent solution. This solution (i.e., first feedstock) was pumped at a rate of 80 milliliters per minute through 100 feet of 0.25-inch outside-diameter stainless steel tubing that was immersed in an oil bath that was heated to 206° C. The flow then passed through an additional 40-foot length of tubing that was immersed in an ice water bath. A backpressure regulator was placed at the end of the tubing to maintain an exit pressure of 250 to 310 psig. The product of this step was a suspension of fine particles of a white solid. This liquid suspension was concentrated to 14.5 weight percent solids using a rotary evaporator. This concentrated suspension (i.e., second feedstock) was pumped at a rate of 10 milliliters per minute through 100 feet of 0.25-inch outside diameter stainless steel tubing that was immersed in an oil bath that was heated to 206° C. The flow then passed through an additional 40-foot length of tubing that was immersed in an ice water bath. A backpressure regulator was placed at the end of the tubing to maintain an exit pressure of 230 to 340 psig. The product of this step was a sol (i.e., zirconia sol) that was concentrated using a rotary evaporator to provide a sol having a concentration of 40.5 weight percent. The characterization data for this preparative example is included in Tables 2 and 3.

Preparative Example 3

Preparation of a Zirconia Sol 3

A mixture having the same composition as that of Preparative Example 2 was prepared. Using a procedure similar to that described for Preparative Example 2, another zirconia sol was prepared in a hydrothermal reactor that had larger tubing diameters. The characterization data for this example is included in Tables 2 and 3.

Example 1

The zirconia sol of Preparative Example 1 was dialyzed for approximately 12 hours using a dialysis membrane having MWCO of greater than 12,000 (available from Sigma-Aldrich Corp., St. Louis, Mo.) to yield a stable sol at 10.93 weight percent solids. The dialyzed zirconia sol (435.01 g) and MEEAA (9.85 g) were charged to a 1 liter round bottom flask and the mixture was concentrated via rotary evaporation. Isopropanol (30 g) and NSEA (35.00 g) were then added to the concentrated sol to form a dispersion. The dispersion was then concentrated using a rotary evaporator to provide a curable resin that contained 48.83 weight percent zirconia and had a refractive index of 1.674. A mixture was prepared by adding 0.39 g TPO-L to 40.09 g of this curable resin. Then, 0.98 g of SR-351 was added to 10.03 g of this mixture.

Example 2

The zirconia sol of Preparative Example 1 was dialyzed for approximately 12 hours using a dialysis membrane having MWCO of greater than 12,000 (available from Sigma-Aldrich Corp., St. Louis, Mo.) to yield a stable sol having 10.93 weight percent solids. The dialyzed zirconia sol (437.02 g) and MEEAA (10 g) were charged to a 1-liter round bottom flask and then the mixture was concentrated to dryness using a rotary evaporator. The powder thus obtained was dispersed in deionized water to afford a mixture that was 21.45 weight percent zirconia. This dispersion (206.5 g) was charged into a jar to which was added, with stirring, 1-methoxy-2-propanol (300 g), SILQUEST A-174 (9.89 g), and SILQUEST A-1230 (6.64 g). This mixture was then poured into a 1-liter screw cap jar that was sealed and was then heated to 90° C. for 3 hours. The mixture was then transferred to a round bottom flask and was concentrated using a rotary evaporator to afford a mixture that was approximately 25.4 weight percent zirconia (i.e., concentrated zirconia).

Deionized water (450 g) and concentrated aqueous ammonia (13.9 g of a 29 weight percent solution) were charged to a 1 L beaker. The concentrated zirconia dispersion was added slowly to the beaker with stirring. The white precipitate thus obtained was isolated via vacuum filtration and was washed with deionized water. The damp solid product was dispersed in 1-methoxy-2-propanol in a round bottom flask to provide a mixture having a concentration of 20.53 weight percent solids. This mixture (117.03 g), SR-339 (15.12 g), HDDA (1.68 g), and a 5 weight percent solution of PROSTAB 5198 in water (0.13 g) were added to a round bottom flask. The water and 1-methoxy-2-propanol were removed using a rotary evaporator to afford a curable resin having a refractive index of 1.584 that was 47.0 weight percent zirconia.

Example 3

The zirconia sol of Preparative Example 2 was dialyzed for approximately 4.5 hours using a SPECTRAPOR dialysis membrane having MWCO of 12,000 to 14,000 (obtained from VWR International, West Chester, Pa.) to yield a stable sol having 33.85 weight percent solids. The dialyzed zirconia sol (53.13 g), MEEAA (1.59 g), BCEA (1.14 g), 1-methoxy-2-propanol (133 g), NSEA (7.09 g) and TMPTA (0.97 g) were charged to a round bottom flask and concentrated via rotary evaporation. The zirconia-containing resin was 58.57 weight percent zirconia and had a refractive index of 1.682. The zirconia-containing resin (21.94 g) and TPO-L (0.09 g) were mixed together.

Example 4

The zirconia sol of Preparative Example 2 was dialyzed for approximately 4.5 hours using a SPECTRAPOR dialysis membrane having MWCO of 12,000 to 14,000 (obtained from VWR International, West Chester, Pa.) to yield a stable sol having 33.85 weight percent solids. The dialyzed zirconia sol (109.90 g), MEEAA (3.28 g), BCEA (2.36 g), 1-methoxy-2-propanol (200 g), NOEA (14.68 g) and TMPTA (2.00 g) were charged to a round bottom flask and concentrated via rotary evaporation. The zirconia-containing resin was 57.22 weight percent zirconia and had a refractive index of 1.661. The zirconia-containing resin (29.47 g) and TPO-L (0.13 g) were mixed together.

Example 5

The zirconia sol of Preparative Example 2 was dialyzed for approximately 4.5 hours using a SPECTRAPOR dialysis membrane having MWCO of 12,000 to 14,000 (obtained from VWR International, West Chester, Pa.) to yield a stable sol having 33.85 weight percent solids. The dialyzed zirconia sol (144.02 g), MEEAA (4.30 g), BCEA (3.09 g), 1-methoxy-2-propanol (300 g), NOEA (10.22 g), TMPTA (4.38 g), BR31 (21.89 g) and a 5 weight percent solution of PROSTAB 5198 in water (0.3 g) were charged to a round bottom flask. The alcohol and water were removed via rotary evaporation. The resulting zirconia-containing resin was 46.97 weight percent zirconia and had a refractive index of 1.636. The zirconia-containing resin (49.03 g) and TPO-L (0.26 g) were mixed together.

Example 6

The zirconia sol of Preparative Example 3 (100.00 g), MEEAA (4.44 g), BCEA (2.13 g), 1-methoxy-2-propanol (115 g), a 50/50 mix of SR-339/BR31 (29.78 g) and a 5 weight percent solution of PROSTAB 5198 in water (0.12 g) were charged to a round bottom flask. The alcohol and water were removed via rotary evaporation. The resulting zirconia-containing resin was approximately 53.3 weight percent zirconia and had a refractive index of 1.642. TPO-L was added to the mixture to provide a composition that contained 0.47 parts per hundred by weight of TPO-L.

Example 7

The zirconia sol of Preparative Example 3 (50.0 g), MEEAA (2.22 g), BCEA (1.06 g), 1-methoxy-2-propanol (75.0 g), and a mixture of equal parts by weight of SR-339 and RDX-51207 (17.60 g) were charged into a round bottom flask. The mixture was concentrated using a rotary evaporator to provide a curable resin that was 49.59 weight percent zirconia and having a refractive index of 1.639. Sufficient TPO-L was added to the mixture to provide a composition that contained 0.5 parts per hundred by weight of TPO-L.

Example 8

The zirconia sol of Preparative Example 3 (200 g), MEEAA (8.81 g), BCEA (4.22 g), 1-methoxy-2-propanol (230 g), a 38/50/12 mix of BR31/SR-339/TMPTA (59.1 g), and a 5 weight percent solution of PROSTAB 5198 in water (0.24 g) were charged to a round bottom flask. The alcohol and water were removed via rotary evaporation. The zirconia-containing resin was 52.31 weight percent zirconia and had a refractive index of 1.638. The zirconia-containing resin (116 g) and TPO-L (0.55 g) were mixed together.

Examples 9-19

The gain of each of the brightness enhancing films prepared using the resins of Examples 1-8 was measured and is given in Table 1. In Table 1, the symbol "---" means that that samples was not prepared. The procedures used to prepare these films are described above.

TABLE 1

Gain of Brightness Enhancing Films

| Film Example | Resin example | HBEF III | HXBEF III | HTBEF | HXTBEF | HDBEF | HDBEF/T-BEF |
|---|---|---|---|---|---|---|---|
| 9 | 1 | 1.799 | 2.361 | — | — | — | — |
| 10 | 2 | 1.766 | 2.434 | — | — | — | — |
| 11 | 3 | 1.955 | 2.606 | — | — | — | — |
| 12 | 4 | 1.901 | 2.568 | 1.89 | 2.595 | — | — |
| 13 | 5 | 1.854 | 2.573 | — | — | — | — |
| 14 | 6 | — | — | — | — | 2.519 | 3.143 |
| 15 | 7 | 1.881 | 2.687 | — | — | — | — |
| 16 | 8 | 1.889 | 2.684 | — | — | — | — |

TABLE 2

Size Distribution of Zirconia Particles

| | Intensity-average Size (nm) | Volume-average Size (nm) | Intensity-average:Volume-average Ratio |
|---|---|---|---|
| ZrO$_2$ Sol 1 | 21.0 | 12.9 | 1.62 |
| ZrO$_2$ Sol 2 | 33.8 | 16.4 | 2.06 |
| ZrO$_2$ Sol 3 | 42.1 | 17.5 | 2.41 |

TABLE 3

X-ray Diffraction Data for Zirconia Particles

| | M Intensity | M Size (nm) | C/T Intensity | C/T Size (nm) | % C/T | XRD Average Size (nm) | Dispersion Index |
|---|---|---|---|---|---|---|---|
| ZrO$_2$ Sol 1 | 18 | 4.0 | 100 | 8.0 | 85 | 7.4 | 1.74 |
| ZrO$_2$ Sol 2 | NA | NA | NA | NA | NA | NA | NA |
| ZrO$_2$ Sol 3 | 9 | 6.5 | 100 | 8.0 | 92 | 7.9 | 2.21 |

We claim:

1. A light management film comprising an optical layer having a microstructured surface, the optical layer comprising (a) a polymeric material; and a plurality of zirconia particles surface-modified with a carboxylic acid, wherein the zirconia particles comprise 1 to 8 weight percent yttrium based on a weight of inorganic oxides in the zirconia particles, and the zirconia particles have an average primary particle size no greater than 30 nanometers and a ratio of intensity-average particle size to volume-average particle size no greater than 3.0.

2. The light management film of claim 1, wherein the light management film is selected from a brightness enhancement film, a reflective film, or a turning film.

3. The light management film of claim 1, wherein the light management film is a brightness enhancement film.

4. The light management film of claim 1, further comprising a base layer adjacent to the optical layer.

5. The light management film of claim 1, wherein the optical layer comprises up to 80 weight percent zirconia particles based on the weight of the optical layer.

6. The light management film of claim 1, wherein the polymeric material has a refractive index of at least 1.50 and is a reaction product of a polymerizable composition comprising an oligomeric material, a reactive diluent, and a multifunctional cross-linking monomer.

7. The light management film of claim 1, wherein the polymeric material is a reaction product of a polymerizable composition comprising a cross-linking agent and a monomer of Formula I

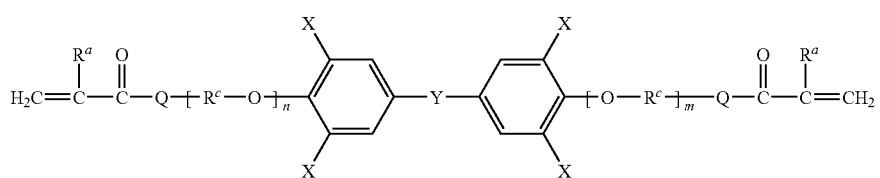

wherein
- $R^a$ is hydrogen or methyl;
- Q is oxy or thio;
- $R^c$ is a $C_2$ to $C_{12}$ alkylene that is unsubstituted or substituted with a hydroxy;
- n is an integer of 0 to 6;
- m is an integer of 0 to 6;
- each X is independently hydrogen, bromo, or chloro; and
- Y is a divalent linking group selected from —C(CH$_3$)$_2$—, —CH$_2$—, —S—, —S(O)—, or —S(O)$_2$—.

8. The light management film of claim 7, the polymerizable composition further comprising a monomer of Formula II

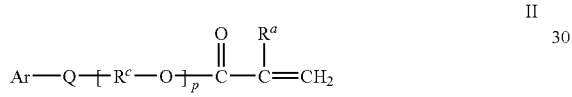

wherein
- Ar is a phenyl or naphthyl that is unsubstituted or substituted with one or more substituents selected from halo, alkyl, aryl, aralkyl, or combination thereof;
- Q is oxy or thio;
- $R^c$ is a $C_2$ to $C_{12}$ alkylene that is unsubstituted or substituted with a hydroxy;
- p is an integer of 0 to 6; and
- $R^a$ is hydrogen or methyl.

9. The light management film of claim 7 wherein each X is hydrogen.

10. The light management film of claim 7 wherein Y is selected from —C(CH$_3$)$_2$— and —CH$_2$—.

11. The light management film of claim 1, wherein the polymeric material is a reaction product of a polymerizable composition comprising a monomer of Formula II

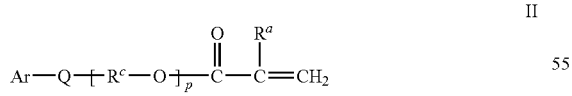

wherein
- Ar is a phenyl or naphthyl that is unsubstituted or substituted with one or more substituents selected from halo, alkyl, aryl, aralkyl, or combination thereof;
- Q is oxy or thio;
- $R^c$ is a $C_2$ to $C_{12}$ alkylene that is unsubstituted or substituted with a hydroxy;
- p is an integer of 0 to 6; and
- $R^a$ is hydrogen or methyl.

12. The light management film of claim 1, wherein the polymeric material is the reaction product of a polymerizable composition comprising a brominated, alkyl-substituted phenyl (meth)acrylate.

13. The light management film of claim 1, wherein the polymerizable composition comprises a monomer of Formula III, a monomer of Formula IV, or a combination thereof

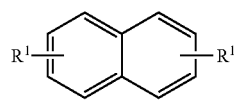

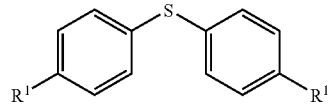

wherein each $R^1$ is independently selected from a formula of

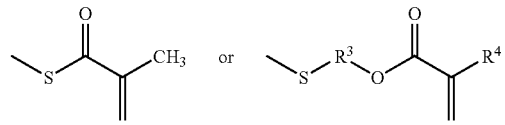

- $R^3$ is $(CH_2)_x$;
- x is an integer of 2 to 8; and
- $R^4$ is hydrogen or methyl.

14. The light management film of claim 1, wherein the polymerizable composition comprises a monomer of Formula V

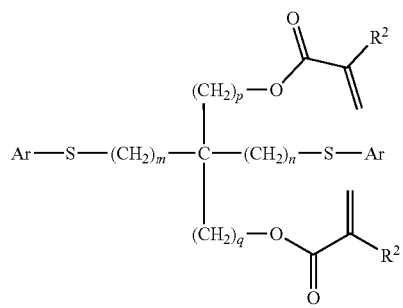

wherein
- $R^2$ is hydrogen or methyl;
- Ar is an aryl;
- m is an integer of 1 to 6;

n is an integer of 1 to 6;
p is an integer of 1 to 6; and
q is an integer of 1 to 6.

15. The light management film of claim 1, wherein the polymeric material is a thermoplastic material.

16. The light management film of claim 1, wherein the zirconia particles are surface modified with a first carboxylic acid that is free of a polymerizable group and a second carboxylic acid that contains a polymerizable group.

17. The light management film of claim 1, wherein the zirconia particles are surface-modified with a silane.

18. The light management film of claim 1 wherein the zirconia particles have a dispersion index of 1 to 3.

19. The light management film of claim 1 wherein the zirconia particles have a crystal structure that is at least 70 percent cubic, tetragonal, or a combination thereof.

20. The light management film of claim 1 wherein the zirconia particles have a dispersion index of 1 to 3, a ratio of intensity-average particle size to volume-average particle size no greater than 3.0, and a crystal structure that is at least 70 percent cubic, tetragonal, or a combination thereof.

21. A light management film comprising an optical layer having a microstructured surface, the optical layer comprising
(a) a polymeric material; and
(b) a plurality of zirconia particles surface-modified with beta-carboxyethylethyl acrylate, mono-2-(methacryloxyethyl)succinate, or a combination thereof; wherein the zirconia particles comprise 1 to 8 weight percent yttrium based on a weight of inorganic oxides in the zirconia particles, and the zirconia particles have an average primary particle size no greater than 30 nanometers and a ratio of intensity-average particle size to volume-average particle size no greater than 3.0.

22. The light management film of claim 21 wherein the zirconia particles have a dispersion index of 1 to 3.

23. The light management film of claim 21 wherein the zirconia particles have a crystal structure that is at least 70 percent cubic, tetragonal, or a combination thereof.

24. The light management film of claim 21 wherein the zirconia particles have a dispersion index of 1 to 3, a ratio of intensity-average particle size to volume-average particle size no greater than 3.0, and a crystal structure that is at least 70 percent cubic, tetragonal, or a combination thereof.

25. A light management film comprising an optical layer having a microstructured surface, the optical layer comprising
(b) a polymeric material; and
a plurality of zirconia particles surface-modified with a carboxylic acid, wherein the zirconia particles comprise 1 to 8 weight percent yttrium based on a weight of inorganic oxides in the zirconia particles, and the zirconia particles have an average primary particle size no greater than 30 nanometers and a dispersion index of 1 to 3.

26. A light management film comprising an optical layer having a microstructured surface, the optical layer comprising
(a) a polymeric material; and
(b) a plurality of zirconia particles surface-modified with beta-carboxyethylethyl acrylate, mono-2-(methacryloxyethyl)succinate, or a combination thereof wherein the zirconia particles comprise 1 to 8 weight percent yttrium based on a weight of inorganic oxides in the zirconia particles, and the zirconia particles have an average primary particle size no greater than 30 nanometers and a dispersion index of 1 to 3.

\* \* \* \* \*

UNITED STATES PATENT AND TRADEMARK OFFICE
CERTIFICATE OF CORRECTION

PATENT NO.        : 7,833,621 B2
APPLICATION NO.   : 12/250660
DATED             : November 16, 2010
INVENTOR(S)       : Clint L. Jones Page 1 of 2

It is certified that error appears in the above-identified patent and that said Letters Patent is hereby corrected as shown below:

Column 8
Line 28, Delete "compatabilizing" and insert -- compatibilizing --, therefor.

Column 9
Line 3, Delete "acyrloxyalkyldialkylalkoxysilanes" and insert -- acryloxyalkyldialkylalkoxysilanes --, therefor.
Line 4, Delete "mercaptoalkyltrialkoxylsilanes" and insert -- mercaptoalkyltrialkoxysilanes --, therefor.

Column 10
Line 67, Delete "divnyl" and insert -- divinyl --, therefor.

Column 11
Line 2, Delete "tetracarylates," and insert -- tetraacrylates, --, therefor.
Line 29, Delete "dipentaertythritol" and insert -- dipentaerythritol --, therefor.
Line 45, Delete "DARACUR" and insert -- DAROCUR --, therefor.

Column 13
Line 5, Delete "bis[2,6-d]bromo" and insert -- bis[2,6-dibromo --, therefor.
Line 6, Delete "proanediyl)]ester." and insert -- propanediyl)]ester. --, therefor.
Line 29, Delete "thereof," and insert -- thereof; --, therefor.

Column 14
Line 17, Delete "polylmerizable" and insert -- polymerizable --, therefor.
Line 42, Delete "hexaacryate," and insert -- hexaacrylate, --, therefor.

Signed and Sealed this
Twenty-second Day of February, 2011

David J. Kappos
*Director of the United States Patent and Trademark Office*

CERTIFICATE OF CORRECTION (continued)
U.S. Pat. No. 7,833,621 B2

Column 21
Line 12, Delete "autogeneous" and insert -- autogenous --, therefor.
Line 21, Delete "Soc." and insert -- Soc., --, therefor.

Column 32
Line 57, Delete "Commun." and insert -- Commun., --, therefor.

Column 34
Line 16, Delete "X" and insert -- $\lambda$ --, therefor.
Line 36, Delete "monoclininc" and insert -- monoclinic --, therefor.

Column 42
Line 42, In Claim 5, delete "80weight" and insert -- 80 weight --, therefor.

Column 43
Line 42, In Claim 8, delete "0to" and insert -- 0 to --, therefor.

Column 44
Line 43, In Claim 13, delete "of2" and insert -- of 2 --, therefor.

Column 46
Line 27, In Claim 26, delete "thereof" and insert -- thereof; --, therefor.